(12) United States Patent
Klein et al.

(10) Patent No.: US 11,874,563 B2
(45) Date of Patent: Jan. 16, 2024

(54) PHOTOALIGNING POLYMER MATERIALS

(71) Applicant: ROLIC TECHNOLOGIES AG, Allschwil (CH)

(72) Inventors: Cedric Klein, Herrlisheim-pres-Colmar (FR); Fabien Xavier Delbaere, Flaxlanden (FR); Richard Frantz, Village-Neuf (FR)

(73) Assignee: ROLIC TECHNOLOGIES AG, Allschwil (CH)

( * ) Notice: Subject to any disclaimer, the term of this patent is extended or adjusted under 35 U.S.C. 154(b) by 896 days.

(21) Appl. No.: 16/636,411

(22) PCT Filed: Aug. 8, 2018

(86) PCT No.: PCT/EP2018/071530
§ 371 (c)(1),
(2) Date: Feb. 4, 2020

(87) PCT Pub. No.: WO2019/030292
PCT Pub. Date: Feb. 14, 2019

(65) Prior Publication Data
US 2020/0174322 A1    Jun. 4, 2020

(30) Foreign Application Priority Data
Aug. 9, 2017  (EP) .................... 17185479

(51) Int. Cl.
*G02F 1/1337* (2006.01)
*C08F 220/30* (2006.01)
*C08F 220/34* (2006.01)

(52) U.S. Cl.
CPC .... *G02F 1/133711* (2013.01); *C08F 220/305* (2020.02); *C08F 220/34* (2013.01); *G02F 1/133788* (2013.01); *C09K 2323/02* (2020.08)

(58) Field of Classification Search
CPC ......... G02F 1/133711; G02F 1/133788; C08F 220/305; C08F 220/34; C09K 2019/0448; C09K 2019/56; C09K 2019/2852; C09K 2323/02
See application file for complete search history.

(56) References Cited

U.S. PATENT DOCUMENTS

| 6,107,427 A | 8/2000 | Herr et al. | |
|---|---|---|---|
| 2013/0281564 A1* | 10/2013 | Seiberle | B32B 27/36 252/182.18 |
| 2016/0376507 A1 | 12/2016 | Hasebe et al. | |

FOREIGN PATENT DOCUMENTS

| EP | 1975687 A1 * | 10/2008 | ....... G02F 1/133788 |
|---|---|---|---|
| EP | 16182085.7 | 7/2016 | |
| EP | 3665241 B1 * | 4/2021 | .......... C08F 220/305 |
| JP | 2005-326439 A | 11/2005 | |
| JP | 2005326439 A * | 11/2005 | |
| JP | 2012107198 A * | 6/2012 | ........... C07D 303/12 |
| JP | 7295091 B * | 6/2023 | .......... C08F 220/305 |
| WO | 2012/085048 A1 | 6/2012 | |
| WO | 2015/024810 A1 | 2/2015 | |

OTHER PUBLICATIONS

International Search Report for PCT/EP2018/071530 dated Nov. 13, 2018 [PCT/ISA/210].
Written Opinion for PCT/EP2018/071530 dated Nov. 13, 2018 [PCT/ISA/237].

* cited by examiner

*Primary Examiner* — Sophie Hon
(74) *Attorney, Agent, or Firm* — Sughrue Mion, PLLC

(57) ABSTRACT

The present invention relates to novel photoaligning polymer materials, to their use as orienting layer for liquid crystals, which are used for the production of non-structured and structured optical elements, electro-optical elements, multi-layer systems or in nanoelectronics.

15 Claims, No Drawings

PHOTOALIGNING POLYMER MATERIALS

CROSS REFERENCE TO RELATED APPLICATIONS

This application is a National Stage of International Application No. PCT/EP2018/071530, filed Aug. 8, 2018, claiming priorities based on European Patent Application No. 17185479.7, filed Aug. 9, 2017.

The present invention is concerned with novel photoaligning polymer materials, with compositions comprising such photoaligning polymer materials, with the use of said photoaligning polymer materials or of said compositions as orienting layer for liquid crystals for the production of non-structured and structured optical elements or electro-optical elements and multi-layer systems and with non-structured and structured optical elements or electro-optical elements or nanoelectrical elements and multi-layer system comprising said novel photoaligning polymer materials or comprising compositions comprising such photoaligning polymer materials.

Optical elements or electro-optical elements are used for example as security devices, liquid crystal device (LCD), and optical films, such as retarders like 3D retarder or as variable transmission films. For example, U.S. Pat. No. 6,107,427 describe photoaligning polymer materials, which can be used in orientation layers. WO 2013/0281564 describes further photoaligning polymer materials, which are used in orientation layers and require less energy and are faster in orienting liquid crystals.

However, there is still an increasing demand for advanced orienting materials giving access to efficient manufacturing processes, as for example roll-to roll-processes, which materials can be coated on different substrates and require less energy compared to the prior art compounds while still providing good orientation for liquid crystals and having superior optical properties.

The object of the invention is therefore to provide novel photoaligning polymer materials, which provide excellent liquid crystal orientation and give access to efficient manufacturing processes while maintaining good optical contrast ratio and optical properties. The novel photoaligning materials of the invention present a very good compatibility with various solvents allowing high flexibility for coating and printing methods. They can be applied at room temperature giving access to a wide range of temperature sensitive substrates. The novel photoaligning polymer materials present very high compatibility with organic materials such as curable compositions or polymerizable liquid crystal giving access to a wide range of applications. Further they have improved adhesion to different substrates.

The present invention relates to photoaligning polymer material comprising repeating structural units of formula (I):

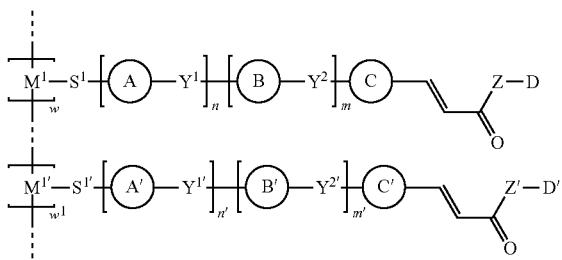

(I)

wherein $M^1$, $M^{1'}$ each independently signify a repeating monomer unit from the group consisting of acrylate, methacrylate, 2-chloroacrylate, 2-phenylacrylate, acrylamide, methacrylamide, 2-chloroacrylamide, 2-phenylacrylamide, N-lower alkyl substituted acrylamide, N-lower alkyl substituted methacrylamide, N-lower alkyl substituted 2-chloroacrylamide, N-lower alkyl substituted 2-phenylacrylamide, vinyl ether, vinyl ester, styrene, diamine, amide, imide, siloxane, amic ester, and amic acid;

$S^1$ is a spacer unit, wherein, if m and n are 0 then the spacer unit is $S^2$ and if at least one m or n is 1, then the spacer unit is $S^3$;

$S^{1'}$ is a spacer unit, wherein, if m' and n' are 0 then the spacer unit is $S^{2'}$ and if at least one m' or n' is 1, then the spacer unit is $S^{3'}$;

wherein $S^2$, $S^{2'}$, $S^3$, $S^{3'}$ are unsubstituted or unsubstituted, straight-chain or branched, $-(CH_2)_r-$, as well as $-(CH_2)_r-O-$, $-(CH_2)_r-O-(CH_2)_s-$, $-(CH_2)_r-O-(CH_2)_s-O-$, $-(CH_2)_r-CO-$, $-(CH_2)_r-CO-O-$, $-(CH_2)_r-NR^2-$, $-(CH_2)_r-CO-NR^2-$, $-(CH_2)_r-NR^2-CO-$, $-(CH_2)_r-NR^2-CO-O-$ or $-(CH_2)_r-NR^2-CO-NR^3-$, which are optionally mono- or poly-substituted with $C_1$-$C_{24}$-alkyl, hydroxy, fluorine, chlorine, cyano, ether, ester, amino, amido;

and wherein one or more $-CH_2-$ groups may be replaced by a linking group, alicyclic or aromatic group;

and, in which r and s are each a whole number of 1 to 20, with the proviso that $3 \leq r+s \leq 24$ for $S^2$; and that $6 \leq r+s \leq 24$, for $S^3$;

and $R^2$ and $R^3$ each independently signify hydrogen or lower alkyl; and rings A, A' each independently signify phenylene which is unsubstituted or optionally substituted with fluorine, chlorine, cyano, alkyl or alkoxy, pyridine-2,5-diyl, pyrimidine-2,5-diyl, 1,3-dioxane-2,5-diyl, cyclohexane-1,4-diyl, piperidine-1,4-diyl or piperazine-1,4-diyl;

rings B, B' each independently signify phenylene which is unsubstituted or optionally substituted with fluorine, chlorine, cyano, alkyl or alkoxy, pyridine-2,5-diyl, pyrimidine-2,5-diyl, 1,4- or 2,6-naphthylene, 1,3-dioxane-2,5-diyl or cyclohexane-1,4-diyl;

$Y^1$, $Y^2$, $Y^{1'}$, $Y^{2'}$ each independently signify a single covalent bond, $-(CH_2)_t-$, $-O-$, $-CO-$, $-CO-O-$, $-O-OC-$, $-CF_2O-$, $-OCF_2-$, $-NR^4-$, $-CO-NR^4-$, $-R^4N-CO-$, $-(CH_2)_u-O-$, $-O-(CH_2)_u-$, $-(CH_2)_u-NR^4-$ or $-NR^4-(CH_2)_u-$, in which $R^4$ signifies hydrogen or lower alkyl;

t signifies a whole number of 1 to 4;

u signifies a whole number of 1 to 3;

rings C, C' each independently signify phenylene which is unsubstituted or optionally substituted with fluorine, chlorine, cyano, alkyl or alkoxy, pyrimidine-2,5-diyl, pyridine-2,5-diyl, 2,5-thiophenylene, 2,5-furanylene, 1,4- or 2,6-naphthylene, Z, Z' each independently signify $-O-$ or $-NR^5-$, in which $R^5$ signifies hydrogen or lower alkyl, or a second group of formula D or D'; and D is a $C_1$-$C_3$ straight-chain or branched alkylene chain which is halogenated at least once or contains one or more siloxane moieties; and D' signifies hydrogen or a straight-chain or branched alkylene group with 1 to 20 carbon atoms which is optionally substituted with halogen or a cycloalkyl residue with 3 to 8 ring atoms which is optionally mono- or poly-substituted with halogen, alkyl, alkoxy or with one or more siloxane moieties; and w and $w^1$ are molar fractions of the comonomers with $0<w\leq1$ and $0\leq w^1<1$.

The term "linking group", as used in the context of the present invention is preferably selected from —O—, —CO, —CO—O—, —O—CO—,

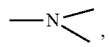

—NR$^1$—, —NR$^1$—CO—, —CO—NR$^1$—, —NR$^1$—CO—O—, —O—CO—NR$^1$—, —NR$^1$—CO—NR$^1$—, —CH=CH—, —C≡C—, —O—CO—O—, and —Si(CH$_3$)$_2$—O—Si(CH$_3$)$_2$—, wherein:

R$^1$ represents a hydrogen atom or $C_1$-$C_6$alkyl;

with the proviso that oxygen atoms of linking groups are not directly linked to each other.

Preferably substituent of straight-chain or branched, —(CH$_2$)$_r$—, as well as —(CH$_2$)$_r$—O—, —(CH$_2$)$_r$—O—(CH$_2$)$_s$—, —(CH$_2$)$_r$—O—(CH$_2$)$_s$—O—, —(CH$_2$)$_r$—CO—, —(CH$_2$)$_r$—CO—O—, —(CH$_2$)$_r$—O—CO—, —(CH$_2$)$_r$—NR$^2$—, —(CH$_2$)$_r$—CO—NR$^2$—, —(CH$_2$)$_r$—NR$^2$—CO—, —(CH$_2$)$_r$—NR$^2$—CO—O— or —(CH$_2$)$_r$—NR$^2$—CO—NR$^3$—, wherein R$^2$ and R$^3$ each independently signify hydrogen or lower alkyl in S$^2$, S$^{2'}$, S$^3$, S$^{3'}$ is $C_1$-$C_{24}$-alkyl, preferably $C_1$-$C_{12}$-alkyl, more preferably $C_1$-$C_8$-alkyl, hydroxy, fluorine, chlorine, cyano, ether, ester, amino or amido.

In the context of the present invention the term "alkyl" is substituted or unsubstituted, straight-chain or branched, saturated hydrocarbon residues with a maximum of 20 carbon atoms, wherein one or more —CH$_2$— or —CH$_3$— groups may be unreplaced or replaced by at least one linking group as described above, or/and alicyclic or/and aromatic group.

The term "lower alkyl" and similarly "lower alkoxy", "hydroxy-lower alkyl", "phenoxy-lower alkyl", "phenyl-lower alkyl", denotes, hereinbefore and hereinafter, straight-chain or branched saturated hydrocarbon residues with 1 to 6, preferably with 1 to 3 carbon atoms, such as methyl, ethyl, propyl, or i-propyl.

The term "alkyl" and similarly "alkoxy", denotes, hereinbefore and hereinafter, straight-chain or branched saturated hydrocarbon residues with a maximum of 20 carbon atoms.

The substituents of "alkyl" or "alkoxy" are hydroxy, fluorine, chlorine, cyano, ether, ester, amino, amido, alicyclic or aromatic groups, wherein in each one or more —CH$_2$— or —CH$_3$— groups may be replaced by at least one linking group.

In the context of the present invention "straight chain alkyl" is without limitation for example methyl, ethyl, propyl, isopropyl, butyl, sec.-butyl, tert.-butyl, pentyl, hexyl, heptyl, octyl, nonyl, decyl, undecyl, dodecyl, tridecyl, tetradecyl, pentadecyl, hexadecyl, heptadecyl, octadecyl, nondecyl, icosyl, henicosyl, docosyl, tricosyl or quatrocosyl.

In the context of the present invention "alicyclic group" denotes for example a substituted or unsubstituted non-aromatic carbocyclic or heterocyclic group and represents for example ring systems, with 3 to 30 carbon atoms, as for example cyclopropane, cyclobutane, cyclopentane, cyclopentene, cyclohexane, cyclohexene, cyclohexadiene, decaline, adamantane, tetrahydrofuran, dioxane, dioxolane, pyrrolidine, piperidine or a steroidal skeleton such as cholesterol, wherein substituents are preferably methyl, ethyl, propyl, butyl, pentyl, hexyl, heptyl, octyl, more preferably methyl, ethyl, propyl, butyl, pentyl, hexyl, and most preferred methyl, ethyl, propyl. Preferred alicyclic group is cyclopentane, cyclopentene, cyclohexane, cyclohexene, and more preferred are cyclopentane or cyclohexane.

In the context of the present invention "aromatic group" denotes preferably five, six, ten or 14 ring atoms, e.g. furane, benzene or phenylene, pyridine, pyrimidine, naphthalene, which may form ring assemblies, such as biphenylene or triphenylene, which are uninterrupted or interrupted by at least a single heteroatom and/or at least a single linking group; or fused polycyclic systems, such as phenanthrene or tetraline. Preferably aromatic group are benzene, phenylene, biphenylene or triphenylene. More preferred aromatic group are benzene, phenylene and biphenylene. Most preferred is phenylene.

The term "phenylene which is unsubstituted or optionally substituted with fluorine, chlorine, cyano, alkyl or alkoxy" embraces in the scope of the present invention 1,2-, 1,3- or 1,4-phenylene, especially however 1,3- or 1,4-phenylene, which is unsubstituted or mono- or multiply-substituted with fluorine, chlorine, cyano, alkyl or alkoxy, preferably with fluorine, methyl, ethyl, propyl, butyl, methoxy, ethoxy, propoxy, butoxy or cyano. Especially preferred are 1,4-phenylene residues. Examples of preferred phenylene residues are 1,3- or, 1,4-phenylene, 4- or 5-methyl-1,3-phenylene, 4- or 5-methoxy-1,3-phenylene, 4- or 5-ethyl-1,3-phenylene, 4- or 5-ethoxy-1,3-phenylene, 2- or 3-methyl-1,4-phenylene, 2- or 3-ethyl-1,4-phenylene, 2- or 3-propyl-1,4-phenylene, 2- or 3-butyl-1,4-phenylene, 2- or 3-methoxy-1,4-phenylene, 2- or 3-ethoxy-1,4-phenylene, 2- or 3-propoxy-1,4-phenylene, 2- or 3-butoxy-1,4-phenylene, 2,3-, 2,6- or 3,5-dimethyl-1,4-phenylene, 2,6- or 3,5-dimethoxy-1,4-phenylene, 2- or 3-fluoro-1,4-phenylene, 2,3-, 2,6- or 3,5-difluoro-1,4-phenylene, 2- or 3-chloro-1,4-phenylene, 2,3-, 2,6- or 3,5-dichloro-1,4-phenylene, 2- or 3-cyano-1,4-phenylene, and the like.

In a more preferred embodiment of the invention S$^2$, S$^{2'}$, S$^3$, S$^{3'}$ is substituted or unsubstituted, straight-chain or branched, —(CH$_2$)$_r$—, as well as —(CH$_2$)$_r$—O—, —(CH$_2$)$_r$—O—(CH$_2$)$_s$—, —(CH$_2$)$_r$—O—(CH$_2$)$_s$—O—, —(CH$_2$)$_r$—CO—, —(CH$_2$)$_r$—CO—O—, —(CH$_2$)$_r$—O—CO—, —(CH$_2$)$_r$—NR$^2$—, —(CH$_2$)$_r$—CO—NR$^2$—, —(CH$_2$)$_r$—NR$^2$—CO—, —(CH$_2$)$_r$—NR$^2$—CO—O— or —(CH$_2$)$_r$—NR$^2$—CO—NR$^3$—, wherein R$^2$ and R$^3$ each independently signify hydrogen or lower alkyl; preferably S$^2$, S$^{2'}$, S$^3$, S$^{3'}$ is optionally mono- or multiply-substituted with $C_1$-$C_{24}$-alkyl, preferably $C_1$-$C_{12}$-alkyl, more preferably $C_1$-$C_8$-alkyl, wherein alkyl has the above given meaning and preferences; or S$^2$, S$^{2'}$, S$^3$, S$^{3'}$ are optionally mono- or multiply-substituted with hydroxy, fluorine, chlorine, cyano, ether, ester, amino, amido; and wherein one or more —CH$_2$— group may be replaced by a linking group, alicyclic or/and aromatic group;

wherein for S$^2$, S$^{2'}$ the single suffix "r" is a whole number between 4 and 24, preferably between 5 and 12 and more preferably between 5 and 8, especially 6 or 8; and for S$^3$, S$^{3'}$ the single suffix "r" is a whole number between 6 and 24, preferably between 6 and 12 and especially 6, 7, 8, 9, 10, 11 or 12; and wherein for S$^2$, S$^{2'}$ the sum of the suffixes "r and s" is a whole number between 1 and 24, preferably between 2 and 12 and more preferably between 5 and 8; and wherein for $S^3$, $S^{3'}$ the sum of the suffixes "r and s" is a whole number between 6 and 24, preferably between 6 and 12 and especially 6, 7, 8, 9, 10, 11 or 12; and $R^2$ and $R^3$ each independently signify hydrogen or lower alkyl.

In a most preferred embodiment of the invention $S^2$, $S^{2'}$, $S^3$, $S^{3'}$ are unsubstituted or unsubstituted, straight-chain or branched, —$(CH_2)_r$—, as well as —$(CH_2)_r$—O—, —$(CH_2)_r$—O—$(CH_2)_s$—, —$(CH_2)_r$—O—$(CH_2)_s$—O—, —$(CH_2)_r$—CO—, —$(CH_2)_r$—CO—O—, —$(CH_2)_r$—O—CO—, especially —$(CH_2)_r$—O—, —$(CH_2)_r$—O—$(CH_2)_s$—, —$(CH_2)_r$—O—$(CH_2)_s$—O—, —$(CH_2)_r$—CO—, —$(CH_2)_r$—CO—O—, —$(CH_2)_r$—O—CO—, more especially —$(CH_2)_r$—O— which is optionally mono- or multiply-substituted with $C_1$-$C_{24}$-alkyl, preferably $C_1$-$C_{12}$-alkyl, more preferably $C_1$-$C_8$-alkyl; or hydroxy, fluorine, chlorine, cyano, ether, ester, amino, amido; and wherein one or more —$CH_2$— group may be replaced by a linking group, or an alicyclic or aromatic group; and wherein the single suffixes r and s and the sum of the suffixes s and r have the above given meanings and preferences; and $R^2$ and $R^3$ each independently signify hydrogen or lower alkyl.

Examples of preferred "spacer units" $S^2$, $S^{2'}$ are 1,6-hexylene, 1,7-heptylene, 2-methyl-1,2-propylene, 1,3-butylene, ethyleneoxycarbonyl, ethyleneoyloxy, propyleneoxy, propyleneoxycarbonyl, propyleneoyloxy, butyleneoxy, butyleneoxycarbonyl, butyleneoyloxy, propyleneamino, butyleneamino, pentyleneamino, hexyleneamino, heptyleneamino, ethyleneaminocarbonyl, propyleneaminocarbonyl, butyleneaminocarbonyl, ethylenecarbonylamino, propylenecarbonylamino, butylenecarbonylamino, pentylenecarbonylamino, hexylenecarbonylamino, heptylenecarbonylamino, pentyleneaminocarbonyl, hexyleneaminocarbonyl, heptyleneaminocarbonyl, pentyleneoxy, pentyleneoxycarbonyl, pentyleneoyloxy, hexyleneoxy, hexyleneoxycarbonyl, hexyleneoyloxy, heptyleneoxy, heptyleneoxycarbonyl, heptyleneoyloxy, especially preferred is hexyleneoxy.

Examples of preferred "spacer units" $S^3$, $S^{3'}$ are 1,6-hexylene, 1,7-heptylene, 1,8-octylene, 1,9-nonylene, 1,10-decylene, 1,11-undecylene, 1,12-dodecylene, 9-nonyleneoxy, 11-undecyleneoxy, 12-dodecyleneoxy, 11-undecyleneoxycarbonyl, 12-dodecyleneoxycarbonyl, nonyleneoxycarbonyl, 11-undecyleneoyloxy, 12-dodecyleneoyloxy, 9-nonyleneoyloxy, 11-undecyleneamino, 12-dodecyleneamino, 9-nonyleneamino, 11-undecyleneaminocarbonyl, 12-dodecyleneaminocarbonyl, 9-nonyleneaminocarbonyl, 11-undecylenecarbonylamino, 12-dodecylene carbonylamino, nonylenecarbonylamino, and the like.

Especially preferred "spacer units" $S^2$, $S^{2'}$ are a straight-chain alkylene groups represented by —$(CH_2)_r$—, wherein r is 6 or 8, as well as —$(CH_2)_r$—O—, —$(CH_2)_r$—CO—O— and —$(CH_2)_r$—O—CO—.

Further, especially preferred "spacer units" $S^3$, $S^{3'}$ are a straight-chain alkylene groups represented by —$(CH_2)_r$—, wherein r is 6, 7, 8, 9, 10, 11, 12, as well as —$(CH_2)_r$—O—, —$(CH_2)_r$—CO—O— and —$(CH_2)_r$—O—CO—.

In the context of the present invention the term "halogenated" means that the repeating structural units or the monomers contain one or more halogen atoms, preferably two halogen atoms, more preferably three halogen atoms. It is encompassed by the present invention that the halogen atoms are all bound to the same carbon atom or to different carbon atoms. It is also encompassed that the same molecule may be halogenated by different halogen atoms. Halogen atoms are fluorine, chlorine, bromine or iodine.

In the context of the present invention "siloxane moieties" means any substituent, linear or branched comprising at least a functional group with the Si—O—Si linkage. The photoaligning polymer materials according to the present invention may contain one or more siloxane moieties.

According to the present invention if $w^1$ is 0 then the photoaligning polymer material is a homopolymer and if $w^1$ is >0 then the photoaligning polymer material is a copolymer.

According to the present invention, if the photoaligning polymer material contains further repeating structural units, said repeating structural units contain a photoaligning group. The photoaligning group comprises photoactive functional groups such as alpha, beta-unsaturated nitrile groups; alpha, beta-unsaturated carbonyl groups, where the carbonyl group can also be part of an ester-, amide, imide, hydrazine or thioester functional group, including cinnamates and chalcones;

coumarines and quinolones;

stilbenes and cyanostilbenes;

azo groups;

chromones and chromenes;

mono- and di-acetylene groups such as diphenylacetylene group;

benzylidenephtalimide group, benzylideneacetophene group, phenylenediacryloyl group; or photodegradable polymers, where these photoactive functional groups can be unsubstituted or comprise substituents such as:

halogen (fluorine, chlorine, bromine); cyano; $C_1$-$C_4$-alkoxy; carboxylic acid; ester groups with linear or branched $C_1$-$C_{12}$ alkyl, optionally substituted with fluorine or cyano groups; linear or branched alkyl and cycloalkyl groups with 1-12 C atoms, optionally substituted with fluorine or cyano groups; aromatic groups with 6-18 C atoms optionally substituted with the aforementioned groups.

Preferred photoactive functional groups are alpha, beta-unsaturated nitrile groups; alpha, beta-unsaturated carbonyl groups, where the carbonyl group can also be part of an ester-, amide or thioester functional group, including cinnamates and chalcones;

coumarines;

stilbenes and azo groups, where these photoactive functional groups can be unsubstituted or comprise substituents such as:

halogen (fluorine, chlorine, bromine); cyano; $C_1$-$C_4$-alkoxy; carboxylic acid; ester groups with linear or branched $C_1$-$C_{12}$ alkyl, optionally substituted with fluorine or cyano groups; linear or branched alkyl and cycloalkyl groups with 1-12 C atoms, optionally substituted with fluorine or cyano groups; aromatic groups with 6-18 C atoms optionally substituted with the aforementioned groups.

It is encompassed by the present invention that if $w^1$ of formula (I) is zero, then the photoaligning polymer material comprises at least one monomer of formula (II)

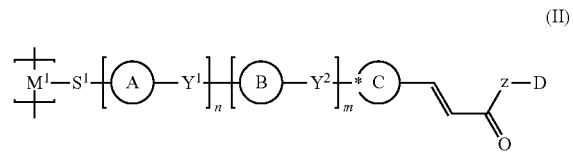
(II)

wherein
M¹, S¹, ring A, ring B, Y¹, Y², m, n, ring C, z and D have the same meaning as defined above.

More preferred are photoaligning polymer materials comprising at least a repeating structural unit according to formula (I) or a monomer according to formula (II) wherein:
M¹ is a monomer unit selected from the group consisting of acrylate, methacrylate;
ring A is unsubstituted phenylene or phenylene which is substituted with alkyl or alkoxy;
ring B is unsubstituted phenylene or phenylene which is substituted with fluorine, alkyl or alkoxy;
Y¹, Y² each independently is a single covalent bond, —CO—O—, —O—OC—;
m, n each independently is 0 or 1;
ring C is unsubstituted phenylene or phenylene which is substituted with alkyl or alkoxy;
S¹ is a spacer unit, wherein if m and n are 0 then the spacer unit is S², and if at least one m or n is 1, preferably if m is 1 and n is 0, then the spacer unit is S³; wherein S² is $C_4$-$C_{24}$ alkylene, preferably alkyleneoxy, or alkyleneoxycarbonyl, especially propyleneoxy, butyleneoxy, pentyleneoxy, hexyleneoxy, heptyleneoxy, octyleneoxy, nonyleneoxy, deyleneoxy, or propylenoxycarbonyl, butylenoxycarbonyl, pentylenoxycarbonyl, hexylenoxycarbonyl, heptylenoxycarbonyl, octylenoxycarbonyl, nonylenoxycarbonyl, deylenoxycarbonyl, and S³ is $C_8$-$C_{24}$ alkylene, and wherein alkylene is unsubstituted or substituted, straight-chain or branched alkylene, in which one or more —$CH_2$— groups may be replaced by at least one linking group, alicyclic or/and aromatic group;
Z is —O—;
D is a $C_1$-$C_3$ straight-chain or branched alkylene chain which is halogenated at least once or contains one or more siloxane moieties.

The present invention also relates to a process for the preparation of the photoaligning polymer material, which comprises the repeating structural units of formula (I) or the monomers of formula (II), comprising polymerising the repeating structural units of formula (I) or the monomers of formula (II).

The present invention also relates to compositions, especially a formulation or/and a blend, comprising a photoaligning polymer material comprising the repeating structural units of formula (I) or the monomers of formula (II), and optionally solvents and/or additives.

Preferably, the composition comprises further solvents, such as especially aprotic or protic polar solvents γ-butyrolactone, N,N-dimethylacetamide, N-methylpyrrolidone or N,N-dimethylformamide, methylethylketon (MEK), methylisobutylketon (MIBK), 3-pentanone, cyclopentanone, cyclohexanone, ethylacetate, n-butylacetate, 1-methoxypropylacetat (MPA), alcohols, isopropanol, n-butanol, butan-2-ol, especially 1-methoxypropanol (MP). Preferred are aprotic polar solvents, especially γ-butyrolactone, N,N-dimethylacetamide, N-methylpyrrolidone or N,N-dimethylformamide, methylethylketon (MEK), methylisobutylketon (MIBK), 3-pentanone, cyclopentanone, cyclohexanone, ethylacetate, n-butylacetate, 1-methoxypropylacetat (MPA).

The photoaligning polymer materials in accordance with the present invention have a molecular weight MW between 10,000 and 1,000,000, preferably between 20,000 and 900,000, more preferably between 50,000 and 500,000, even more preferably between 75,000 and 400,000, especially more preferably between 100,000 and 300,000.

($M^1$) or ($M^{1'}$) are acrylates such as

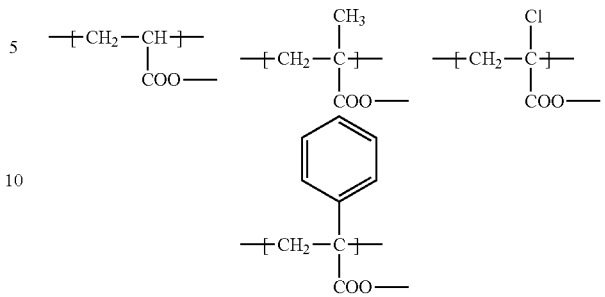

acrylamides such as

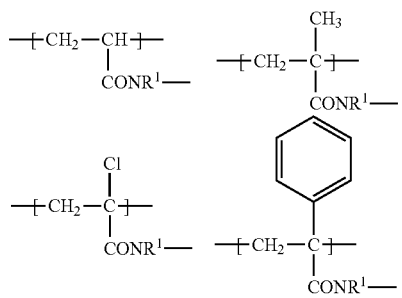

vinyl ether and vinyl ester such as

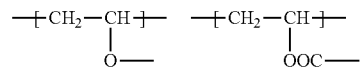

styrene derivatives such as

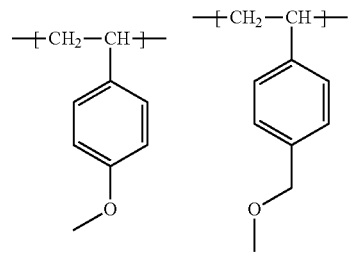

siloxanes such as

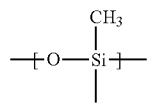

wherein $R^1$ signifies hydrogen or lower alkyl.

Preferred examples of ($M^1$) or ($M^{1'}$) are acrylate, methacrylate, 2-chloroacrylate, acrylamide, methacrylamide, 2-chloro-acrylamide, styrene derivatives and siloxanes. Acrylate, methacrylate, styrene derivatives and siloxanes are particularly preferred ($M^1$) or ($M^{1'}$)'.

Quite especially preferred ($M^1$) or ($M^{1'}$) are acrylate, methacrylate and styrene derivatives. More preferred ($M^1$) or ($M^{1'}$) are methacrylate or methacrylate derivatives.

Further, preferred photoaligning polymer materials according to the present invention comprise repeating structural units of formula (I) or monomers of formula (II) in which:

$M^1$ or $M^{1'}$ are acrylate, methacrylate and styrene derivatives;

ring A signifies phenylene which is unsubstituted or optionally substituted with fluorine, chlorine, cyano, alkyl or alkoxy, pyridine-2,5-diyl, pyrimidine-2,5-diyl, cyclohexane-1,4-diyl;

ring B signifies phenylene which is unsubstituted or optionally substituted with fluorine, chlorine, cyano, alkyl or alkoxy, pyridine-2,5-diyl, pyrimidine-2,5-diyl, 1,4- or 2,6-naphthylene, cyclohexane-1,4-diyl;

$Y^1$, $Y^2$ each independently signify a single covalent bond, —$CH_2CH_2$—, —O—, —$CF_2O$—, —$OCF_2$—, —$CH_2$—O—, —O—$CH_2$—, —CO—O— or —O—OC—;

ring C signifies phenylene which is unsubstituted or optionally substituted with fluorine, chlorine, cyano, alkyl or alkoxy, or pyrimidine-2,5-diyl, pyridine-2,5-diyl, 2,5-furanylene, 1,4- or 2,6-naphthylene;

Z signifies —O— and $S^1$, $S^{1'}$, A', B', n', m', $Y^{1'}$, $Y^{2'}$, C', Z', D, D' w, $w^1$, m and n have the significance given above.

Especially preferred photoaligning polymer materials comprise repeating structural units of formula (I) in which n=0 and $w^1$ is zero, wherein:

$M^1$ is acrylate, methacrylate and styrene derivatives ring B signifies phenylene which is unsubstituted or optionally substituted with fluorine, chlorine, cyano, alkyl or alkoxy, pyridine-2,5-diyl, pyrimidine-2,5-diyl, cyclohexane-1,4-diyl;

$Y^2$ signifies a single covalent bond, —CO—O— or —O—OC—;

$S^2$, $S^3$ is substituted or unsubstituted, straight-chain or branched, —$(CH_2)_r$—, as well as —$(CH_2)_r$—O—, —$(CH_2)_r$—O—$(CH_2)_s$—, —$(CH_2)_r$—O—$(CH_2)_s$—O—, —$(CH_2)_r$—CO—, —$(CH_2)_r$—CO—O—, —$(CH_2)_r$—O—CO—, —$(CH_2)_r$—$NR^2$—, —$(CH_2)_r$—CO—$NR^2$—, —$(CH_2)_r$—$NR^2$—CO—, —$(CH_2)_r$—$NR^2$—CO—O— or —$(CH_2)_r$—$NR^2$—CO—$NR^3$—, wherein the suffix "r" is a whole number between 4 and 24, preferably between 5 and 12, more preferably between 5 and 10, even more preferably between 5 and 8, especially between 6 and 8; and m signifies 0 or 1;

ring C signifies phenylene which is unsubstituted or optionally substituted with fluorine, chlorine, cyano, alkyl or alkoxy, or 1,4- or 2,6-naphthylene;

Z signifies —O— and

D is a $C_1$-$C_3$ straight-chain or branched alkylene chain which is halogenated at least once or contains one or more siloxane moieties.

Even more preferred photoaligning polymer materials comprise repeating structural units of formula (I) in which n=m=0 and $w^1$ is zero, wherein:

$M^1$ is acrylate, methacrylate and styrene derivatives;

$S^2$ is substituted or unsubstituted, straight-chain or branched, —$(CH_2)_r$—, as well as —$(CH_2)_r$—O—, —$(CH_2)_r$—O—$(CH_2)_s$—, —$(CH_2)_r$—O—$(CH_2)_s$—O—, —$(CH_2)_r$—CO—, —$(CH_2)_r$—CO—O—, —$(CH_2)_r$—O—CO—, —$(CH_2)_r$—$NR^2$—, —$(CH_2)_r$—CO—$NR^2$—, —$(CH_2)_r$—$NR^2$—CO—, —$(CH_2)_r$—$NR^2$—CO—O— or —$(CH_2)_r$—$NR^2$—CO—$NR^3$—, wherein the suffix "r" is a whole number between 4 and 24, preferably between 5 and 12 and more preferably between 5 and 8, especially between 6 and 8; and ring C signifies phenylene which is unsubstituted or optionally substituted with fluorine, chlorine, cyano, alkyl or alkoxy, or 1,4- or 2,6-naphthylene;

Z signifies —O— and

D is a $C_1$-$C_3$ straight-chain or branched alkylene chain which is halogenated at least once or contains one or more siloxane moieties.

Even more preferred photoaligning polymer materials comprise repeating structural units of formula (I) in which n=m=0 and $w^1$ is zero, wherein:

$M^1$ is methacrylate;

$S^2$ is substituted or unsubstituted, straight-chain or branched, —$(CH_2)_r$—, as well as —$(CH_2)_r$—O—, —$(CH_2)_r$—O—$(CH_2)_s$—, —$(CH_2)_r$—O—$(CH_2)_s$—O—, —$(CH_2)_r$—CO—, —$(CH_2)_r$—CO—O—, —$(CH_2)_r$—O—CO—, —$(CH_2)_r$—$NR^2$—, —$(CH_2)_r$—CO—$NR^2$—, —$(CH_2)_r$—$NR^2$—CO—, —$(CH_2)_r$—$NR^2$—CO—O— or —$(CH_2)_r$—$NR^2$—CO—$NR^3$—, wherein the suffix "r" is a whole number between 4 and 24, preferably between 5 and 12 and more preferably between 5 and 8, especially between 6 and 8; and ring C signifies phenylene which is unsubstituted or optionally substituted with fluorine, chlorine, cyano, alkyl or alkoxy, or 1,4- or 2,6-naphthylene;

Z signifies —O— and

D is a $C_1$-$C_3$ straight-chain or branched alkylene chain which is halogenated at least once or contains one or more siloxane moieties.

Even more preferred photoaligning polymer materials comprise repeating structural units of formula (I) in which n=m=0 and $w^1$ is zero, wherein:

$M^1$ is methacrylate;

$S^2$ is substituted or unsubstituted, straight-chain or branched, —$(CH_2)_r$—, as well as —$(CH_2)_r$—O—, —$(CH_2)_r$—O—$(CH_2)_s$—, —$(CH_2)_r$—O—$(CH_2)_s$—O—, —$(CH_2)_r$—CO—, —$(CH_2)_r$—CO—O—, —$(CH_2)_r$—O—CO—, —$(CH_2)_r$—$NR^2$—, —$(CH_2)_r$—CO—$NR^2$—, —$(CH_2)_r$—$NR^2$—CO—, —$(CH_2)_r$—$NR^2$—CO—O— or —$(CH_2)_r$—$NR^2$—CO—$NR^3$—, wherein the suffix "r" is a whole number between 4 and 24, preferably between 5 and 12 and more preferably between 5 and 8, especially between 6 and 8; and ring C signifies phenylene which is unsubstituted or optionally substituted with fluorine, chlorine, cyano or methoxy;

Z signifies —O— and

D is a $C_1$-$C_3$ straight-chain or branched alkylene chain which is halogenated at least once or contains one or more siloxane moieties.

Even more preferred photoaligning polymer materials comprise repeating structural units of formula (I) in which n=m=0 and $w^1$ is zero, wherein:

$M^1$ is methacrylate;

$S^2$ is substituted or unsubstituted, straight-chain or branched, —$(CH_2)_r$—, as well as —$(CH_2)_r$—O—, —$(CH_2)_r$—O—$(CH_2)_s$—, —$(CH_2)_r$—O—$(CH_2)_s$—O—, —$(CH_2)_r$—CO—, —$(CH_2)_r$—CO—O—, —$(CH_2)_r$—O—CO—, —$(CH_2)_r$—$NR^2$—, —$(CH_2)_r$—CO—$NR^2$—, —$(CH_2)_r$—$NR^2$—CO—, —$(CH_2)_r$—$NR^2$—CO—O— or —$(CH_2)_r$—$NR^2$—CO—$NR^3$—, wherein the suffix "r" is a whole number between 4 and 24, preferably between 5 and 12 and more preferably between 5 and 8, especially between 6 and 8; and ring C signifies phenylene which is unsubstituted or optionally substituted with fluorine, chlorine, cyano or methoxy;

Z signifies —O— and

D is a $C_1$-$C_3$ straight-chain or branched alkylene chain which is halogenated at least once with fluorine or contains one or more siloxane moieties.

Even more preferred photoaligning polymer materials comprise repeating structural units of formula (I) in which n=m=0 and $w^1$ is zero, wherein:

$M^1$ is methacrylate;

$S^2$ is substituted or unsubstituted, straight-chain or branched, —$(CH_2)_r$—, as well as —$(CH_2)_r$—O—, —$(CH_2)_r$—O—$(CH_2)_s$—, —$(CH_2)_r$—O—$(CH_2)_s$—O—, —$(CH_2)_r$—CO—, —$(CH_2)_r$—CO—O—, —$(CH_2)_r$—O—CO—, —$(CH_2)_r$—$NR^2$—, —$(CH_2)_r$—CO—$NR^2$—, —$(CH_2)_r$—$NR^2$—CO—, —$(CH_2)_r$—$NR^2$—CO—O— or —$(CH_2)_r$—$NR^2$—CO—$NR^3$—, wherein the suffix "r" is a whole number between 4 and 24, preferably between 5 and 12 and more preferably between 5 and 8, especially between 6 and 8; and ring C signifies phenylene which is unsubstituted or optionally substituted with fluorine, chlorine, cyano or methoxy;

Z signifies —O— and

D is a $C_1$-$C_3$ straight-chain or branched alkylene chain which is halogenated at least once with fluorine or contains one.

If $w^1$>0, then the photoaligning photoaligning polymer materials according to the present invention are copolymers. Preferred are photoaligning copolymer materials comprising repeating structural units of formula (I), wherein $M^1$ and $S^1$ as well as $M^{1'}$ and $S^{1'}$ as well as m, n, m', n' are as defined above; and rings A, A' each independently signify phenylene which is unsubstituted or optionally substituted with fluorine, chlorine, cyano, alkyl or alkoxy, pyridine-2,5-diyl, pyrimidine-2,5-diyl, cyclohexane-1,4-diyl;

rings B, B' each independently signify phenylene which is unsubstituted or optionally substituted with fluorine, chlorine, cyano, alkyl or alkoxy, pyridine-2,5-diyl, pyrimidine-2,5-diyl, 1,4- or 2,6-naphthylene or cyclohexane-1,4-diyl;

$Y^1$, $Y^2$, $Y^{1'}$, $Y^{2'}$ each independently signify a single covalent bond, —$CH_2CH_2$—, —O—, —$CH_2$—O—, —O—$CH_2$—, —$OCF_2$—, —$CF_2O$—, CO—O— or —O—CO—;

rings C, C' each independently signify phenylene which is unsubstituted or optionally substituted with fluorine, chlorine, cyano, alkyl or alkoxy, or pyrimidine-2,5-diyl, pyridine-2,5-diyl, 2,5-furanylene or 1,4- or 2,6-naphthylene;

Z, Z' signify —O— and

D is a $C_1$-$C_3$ straight-chain or branched alkylene chain which is halogenated at least once or contains one or more siloxane moieties; and D' is a straight-chain or branched alkylene group with 1 to 20, carbon atoms, preferably 1 to 12 carbon atoms or a cycloalkyl residue with 5 to 6 ring atoms which is optionally mono- or poly-substituted with alkyl, alkoxy, especially with methyl or methoxy or with one or more siloxane moieties.

Especially preferred are photoaligning copolymer materials comprising repeating structural units of formula (I), wherein n and n' signify 0 and $M^1$ and $S^1$ as well as $M^{1'}$ and $S^{1'}$ and m, m' are as defined above; and rings B, B' each independently signify phenylene which is unsubstituted or optionally substituted with fluorine, chlorine, cyano, alkyl or alkoxy, pyridine-2,5-diyl, pyrimidine-2,5-diyl or cyclohexane-1,4-diyl;

$Y^2$, $Y^{2'}$ each independently signify a single covalent bond, —CO—O— or —O—OC—;

rings C, C' each independently signify phenylene which is unsubstituted or optionally substituted with fluorine, chlorine, cyano, alkyl or alkoxy or 1,4- or 2,6-naphthylene;

Z, Z' signify —O— and

D, is a $C_1$-$C_3$ straight-chain or branched alkylene chain which is halogenated at least once or contains one or more siloxane moieties; and D' is a straight-chain or branched alkylene group with 1 to 12, carbon atoms, preferably 1 to 12 carbon atoms or a cycloalkyl residue with 5 to 6 ring atoms which is optionally mono- or poly-substituted with alkyl, alkoxy, especially with methyl or methoxy or with one or more siloxane moieties.

Especially preferred are photoaligning copolymer materials comprising repeating structural units of formula (I), wherein n, n', m and m' signify 0 and $M^1$ and $S^1$ as well as $M^{1'}$ and $S^{1'}$ are as defined above; and rings C, C' each independently signify phenylene which is unsubstituted or optionally substituted with fluorine, chlorine, cyano, alkyl or alkoxy or 1,4- or 2,6-naphthylene;

Z, Z' signify —O—; and

D, is a $C_1$-$C_3$ straight-chain or branched alkylene chain which is halogenated at least once or contains one or more siloxane moieties; and D' is a straight-chain or branched alkylene group with 1 to 12, carbon atoms, preferably 1 to 12 carbon atoms or a cycloalkyl residue with 5 to 6 ring atoms which is optionally mono- or poly-substituted with alkyl, alkoxy, especially with methyl or methoxy or with one or more siloxane moieties.

Especially preferred are photoaligning copolymer materials comprising repeating structural units of formula (I), wherein n, n', m and m' signify 0 and $M^1$ and $S^1$ as well as $M^{1'}$ and $S^{1'}$ are as defined above; and rings C, C' each independently signify phenylene which is unsubstituted or optionally substituted with fluorine, chlorine, cyano, or methoxy;

Z, Z' signify —O—; and

D, is a $C_1$-$C_3$ straight-chain or branched alkylene chain which is halogenated at least once with fluorine or contains one or more siloxane moieties; and D' is a straight-chain or branched alkylene group with 1 to 12, carbon atoms, preferably 1 to 12 carbon atoms or a cycloalkyl residue with 5 to 6 ring atoms which is optionally mono- or poly-substituted with alkyl, alkoxy, especially with methyl or methoxy or with one or more siloxane moieties.

Quite especially preferred is homopolymer material comprising monomers of formula (II).

Homopolymer photoaligning polymer materials comprising monomers of formula (II) are preferred:

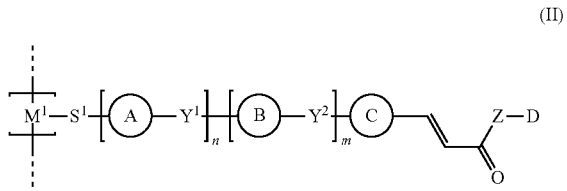

(II)

wherein $M^1$, $S^1$, ring A, ring B, ring C, D, Z, $Y^1$, $Y^2$, m and n are as defined above.

Especially preferred are homopolymer material comprising repeating structural units of formula (II), wherein $M^1$, $S^1$ and m, n are as defined as above; and ring A signifies phenylene which is unsubstituted or optionally substituted with fluorine, chlorine, cyano, alkyl or alkoxy, pyridine-2,5-diyl, pyrimidine-2,5-diyl, cyclohexane-1,4-diyl;

ring B signifies phenylene which is unsubstituted or optionally substituted with fluorine, chlorine, cyano, alkyl or alkoxy, pyridine-2,5-diyl, pyrimidine-2,5-diyl, 1,4- or 2,6-naphthylene or cyclohexane-1,4-diyl;

$Y^1$, $Y^2$ each independently signify a single covalent bond, —$CH_2CH_2$—, —O—, —$CH_2$—O—, —O—$CH_2$—, —CO—O—, —O—OC—, —$CF_2$—O— or —O—$F_2C$—;

ring C signifies phenylene which is unsubstituted or optionally substituted with fluorine, chlorine, cyano, alkyl or alkoxy, or pyrimidine-2,5-diyl, pyridine-2,5-diyl, 2,5-furanylene or 1,4- or 2,6-naphthylene;

Z signifies —O—, and

D is a $C_1$-$C_3$ straight-chain or branched alkylene chain which is halogenated at least once or contains one or more siloxane moieties; more preferably the halogen is fluorine.

Especially preferred are homopolymer compositions with repeating structural units of formula I, wherein n signifies 0 and $M^1$ and $S^1$ are as defined above; and ring B signifies phenylene which is unsubstituted or optionally substituted with fluorine, chlorine, cyano, alkyl or alkoxy, pyridine-2,5-diyl, pyrimidine-2,5-diyl or cyclohexane-1,4-diyl;

$Y^2$ signifies a single covalent bond, —CO—O— or —O—OC—;

m signifies 0 or 1;

ring C signifies phenylene which is unsubstituted or optionally substituted with fluorine, chlorine, cyano, alkyl or alkoxy or 1,4- or 2,6-naphthylen;

Z signifies —O—, and

D is a $C_1$-$C_3$ straight-chain or branched alkylene chain which is halogenated at least once or contains one or more siloxane moieties, D is especially fluorinated at least once, more especially D is a fluorinated $C_2$ alkylene chain, even more especially, D is a 2,2,2-trifluoro-ethyl.

Especially preferred are homopolymer compositions with repeating structural units of formula I, wherein n signifies 0 and $M^1$ and $S^1$ are as defined above; and ring B signifies phenylene which is unsubstituted or optionally substituted with fluorine, chlorine, cyano, alkyl or alkoxy, pyridine-2,5-diyl, pyrimidine-2,5-diyl or cyclohexane-1,4-diyl;

$Y^2$ signifies a single covalent bond, —CO—O— or —O—OC—;

m signifies 0 or 1;

ring C signifies phenylene which is unsubstituted or optionally substituted with fluorine, chlorine, cyano, or methoxy;

Z signifies —O—, and

D is a $C_1$-$C_3$ straight-chain or branched alkylene chain which is halogenated at least once or contains one or more siloxane moieties, D is especially fluorinated at least once, more especially D is a fluorinated $C_2$ alkylene chain, even more especially, D is a 2,2,2-trifluoro-ethyl.

Especially preferred are homopolymer compositions with repeating structural units of formula I, wherein n and m signify 0 and $M^1$ and $S^1$ are as defined above; and ring C signifies phenylene which is unsubstituted or optionally substituted with fluorine, chlorine, cyano, alkyl or alkoxy or 1,4- or 2,6-naphthylen;

Z signifies —O—, and

D is a $C_1$-$C_3$ straight-chain or branched alkylene chain which is halogenated at least once or contains one or more siloxane moieties, D is especially fluorinated at least once, more especially D is a fluorinated C2 alkylene chain, even more especially, D is a 2,2,2-trifluoro-ethyl.

Especially preferred are homopolymer compositions with repeating structural units of formula I, wherein n and m signify 0 and $M^1$ and $S^1$ are as defined above; and ring C signifies phenylene which is unsubstituted or optionally substituted with fluorine, chlorine, cyano or methoxy;

Z signifies —O—, and

D is a $C_1$-$C_3$ straight-chain or branched alkylene chain which is halogenated at least once or contains one or more siloxane moieties, D is especially fluorinated at least once, more especially D is a fluorinated C2 alkylene chain, even more especially, D is a 2,2,2-trifluoro-ethyl.

The photoaligning polymer materials comprising repeating structural units of formula (I) or monomers of formula (II) are characterized by being readily accessible. The methods for the production of the photoaligning polymer materials according to the present invention are known to a person skilled in the art.

The present invention relates to a process for the preparation of the photoaligning polymer material comprising repeating structural units of formula (I) or monomers of formula (II) comprising polymerizing the repeating structural units.

The photoaligning polymer material comprising the repeating structural units of formula (I) or the monomers of formula (II) can be prepared in principle according to two different processes. In addition to the direct polymerization of pre-finished monomers there exists the possibility of polymer-analogous reaction of reactive cinnamic acid derivatives with functional polymers.

For the direct polymerization, the repeating structural units of formula (I) or the monomers of formula (II) are firstly prepared separately from the individual components. The formation of the polymers is subsequently effected in a manner known per se under the influence of UV radiation or heat or by the action of radical initiators or inorganic or organic peroxides or ionic initiators. The radical initiators can be azo based, as for example azobisisobutyronitrile (AIBN), Azobismethylbutyronitrile (AMBN), 2,2'-Azobis (2-methylpropionamidine) dihydrochloride (AAPH), 1,1'-Azobis(cyanocyclohexane) (ACHN), 4,4'-Azobis(4-cyanovaleric acid) (ACVA) and similar compounds. Examples of inorganic peroxides are sodium persulfate, potassium persulfate or ammonium persulfate. Examples of organic peroxides are ter-butylperoxide, dicumylperoxide, lauroylperoxide or peroxycarbonate. Examples of commercial peroxides are Luperox® LP (lauroylperoxide), Luperox® DI (di-tertbutylperoxide) or Perkadox® IPP (Diisopropyl peroxydicarbonate) but not limited to. Ionic initiators are alkali-organic compounds such as phenyllithium or naphthylsodium or Lewis acids such as $BF_3$, $AlCl_3$, $SnCl_3$ or $TiCl_4$. These lists are not exhaustive and other initiators are contemplated in the context of the present invention as well. The monomers can be polymerized in solution, suspension, emulsion or by precipitation but not limited to.

Solvents that are used in the preparation of the polymers according to the invention are as defined above.

In the second process a photoaligning polymer material comprising repeating structural units of formula (I) or monomers of formula (II) can also be produced in a polymer-analogous reaction from a pre-finished functional polymer and a suitable functionalized cinnamic acid derivative. Many known processes such as, for example, esterification, trans-esterification, amidation or the etherification are suitable for polymer-analogous reactions.

The etherification of hydroxycinnamic acid derivatives with polyhydroxyalkyl acrylates or polyhydroxyalkyl methacrylates in solution under the conditions of the Mitsunobu reaction has been found to be advantageous here. Thus, the reaction can be carried out, for example, in that all hydroxy groups are reacted (homopolymer) or in that after the reaction hydroxy groups are still free on the polymer, which can then be further functionalized in a further polymer-analogous reaction, by which means copolymers can be synthesized. An alternative possibility for the production of copolymers according to this process comprises using mixtures of different cinnamic acid derivatives.

The cinnamic acids are partially commercially available or can be obtained according to methods known in the literature such as, for example, the Knoevenagel reaction or the Wittig reaction from commercially available aldehydes or from cyano compounds which are obtained by previous reduction to the corresponding aldehydes. The cinnamic esters or amides can then be prepared from the cinnamic acids according to known esterification procedures.

The photoaligning polymer material comprising repeating structural units of formula (I) or monomers of formula (II) is in general used in form of a composition, especially a formulation or blend.

Hence, the present invention further comprises a composition comprising a photoaligning polymer material comprising repeating structural units of formula (I) or monomers of formula (II) and optionally a solvent within the meaning and preferences as given above for solvents, and in addition optionally comprises further additives or compounds, such as silane-containing compounds or/and
epoxy-containing crosslinking agents or/and
photo-active additives such photo-sensitizers or photo-radical generators, or/and
cationic photo-initiators, or/and
surfactants, or/and
emulsifiers, or/and
antioxidant, or/and
leveling agent, or/and
polymerizable liquid crystals, or/and
curable compounds.

Suitable silane-containing additives are described in Plast. Eng. 36 (1996), (Polyimides, fundamentals and applications), Marcel Dekker, Inc.

Suitable epoxy-containing cross-linking additives include 4,4'-methylene-bis-(N,N-diglycidylaniline), trimethylolpropane triglycidyl ether, benzene-1,2,4,5-tetracarboxylic acid 1,2,4,5-N,N'-diglycidyldiimide, polyethylene glycol diglycidyl ether, N,N-diglycidylcyclohexylamine and the like.

Suitable photo-active additives include 2,2-dimethoxyphenylethanone, a mixture of diphenylmethanone and N,N-dimethylbenzenamine or ethyl 4-(dimethylamino)benzoate, xanthone, thioxanthone, Irgacure® 184, 369, 500, 651 and 907 (BASF), Michler's ketone, triaryl sulfonium salt and the like.

The curable compounds are both organic and inorganic compounds and they do not comprise any photo-alignable moiety. Curable compounds are used to planarize surfaces or carriers in order to reduce the surface inhomogeneity, to make surfaces or carriers harder, more resistant to scratches or more resistant to mechanical or to chemical abrasion. Such curable compounds include polymers, dendrimers, oligomers, prepolymers and monomers, which may be polymerized either by radiation or by heat. Examples of classes of suitable polymers are, but not limited to: polyalkylenes, such as polyethylene, polypropylene, polycycloolefine COP/COC, polybutadiene, poly(meth)acrylates, polyester, polystyrene, polyamide, polyether, polyurethane, polyimide, polyamide acid, polycarbonate, poly-vinylalcohol, poly-vinylchloride, cellulose and cellulose derivatives such as cellulose triacetate. Examples of suitable classes of monomers are: mono and multifunctional (meth)acrylates, epoxies, isocyanate, allyl derivatives and vinyl ethers.

It is encompassed by the present invention that the curable compounds may be added to the compositions comprising the photoaligning polymer materials comprising the repeating structural units according to formula (I) or the monomer of formula (II). Also encompassed is that the curable compounds may be added as a layer below or above the orienting layer according to the present invention.

The present invention also relates to the use of the photoaligning polymer materials comprising repeating structural units of formula (I) or monomers of formula (II) as orienting layer for liquid crystals.

Further, the present invention relates to a method for the preparation of an orientation layer for liquid crystals comprising irradiating the photoaligning polymer material, which comprises repeating structural units of formula (I) or monomers of formula (II) or the composition comprising the photoaligning polymer material which comprises repeating structural units of formula (I) or monomers of formula (II) with aligning light.

Preferably, the method comprises:

applying a composition comprising a photoaligning polymer material comprising repeating structural units of formula (I) or monomers of formula (II) within the meaning and preferences as described above to a carrier, and irradiating the photoaligning polymer material which comprises repeating structural units of formula (I) or monomers of formula (II) or the composition comprising the photoaligning polymer material which comprises repeating structural units of formula (I) or monomers of formula (II) with aligning light.

Especially preferred is the method, wherein two irradiation processes are conducted one with aligning light and the other with or without aligning light, such as isotropic light.

The term "carrier" as used in the context of the present invention is preferably transparent or not-transparent, birefringent or non-birefringent, preferably glass or plastic substrates, polymer films, such as polyethylenenaphtalate (PEN), polyethyleneterephthalat (PET), tri-acetyl cellulose (TAC), polypropylen, polycarbonate (PC), polymethylmethacrylate (PMMA), Cycloolefin copolymer (COP), or a silicon wafer, however not limited to them. The carrier can be rigid or flexible and of any form or any shape such as concave or convex. The carrier may have additional layers, such as organic, dielectric or metallic layers. The layers can have different functions, for example an organic layer can be coated as a primer layer which increases compatibility of the materials to be coated with the support. Metallic layers (such as Indium Tin Oxide (ITO)) may be used as electrodes, for example when used in electrooptical devices such as displays, or could have the function as a reflector. The carrier may also be an optical element or device which has certain functions, such as a substrate for an LCD, which might, for example, comprise thin film transistors, electrodes or color filters. In another example, the carrier is a device comprising an OLED layer structure. The carrier could also be a retarder film, a polarizer, such as a polarizing film or a sheet polarizer, a reflective polarizer, such as the commercially available Vikuity™ DBEF film however not limited to them.

In general, the composition is applied by general coating and printing methods known in the art. Coating methods are for example spin-coating, air doctor coating, blade coating, knife coating, kiss roll coating, cast coating, slot-orifice coating, calendar coating, die coating, dipping, brushing, casting with a bar, roller-coating, flow-coating, wire-coating, spray-coating, dip-coating, whirler-coating, cascade-coating, curtain-coating, air knife coating, gap coating, rotary screen, reverse roll coating, gravure coating, metering rod (Meyer bar) coating, slot die (Extrusion) coating, hot melt coating, roller coating, flexo coating, electrodepositing coating.

Printing methods are for example silk screen printing, relief printing such as flexographic printing, ink jet printing, intaglio printing such as direct gravure printing or offset gravure printing, lithographic printing such as offset printing, or stencil printing such as screen printing.

The carrier may be moving during the deposition of the photoaligning polymer material or of the composition comprising the photoaligning polymer material and/or the photo-alignable material. For example, when production is done in a continuous roll-to-roll process.

In the context of the present invention, the term "aligning light" shall mean light, which can induce anisotropy in a photo-alignable material and which is at least partially linearly or elliptically polarized and/or is incident to the surface of an orienting layer from an oblique direction. Preferably, the aligning light is linearly polarized with a degree of polarization of more than 5:1. Wavelengths, intensity and energy of the aligning light are chosen depending on the photosensitivity of the photoalignable material and of the photoaligning group. Typically, the wavelengths are in the UV-A, UV-B and/or UV-C range or in the visible range. Preferably, the aligning light comprises light of wavelengths less than 450 nm. More preferred is that the aligning light comprises light of wavelengths less than 420 nm.

The UV light is preferably selected according to the absorption of the photoaligning groups, i.e. the absorption of the film should overlap with the emission spectrum of the lamp used for the LP-UV irradiation, more preferably with linearly polarized UV light. The intensity and the energy used are chosen depending on the photosensitivity of the material and on the orientation performances that are targeted. In most of the cases, very low energies (few mJ/cm2) already lead to high orientation quality.

More preferably, "aligning light" is at least partially linearly polarized, elliptically polarized, such as for example circularly polarized, or non-polarized, most preferably circularly polarized, or non-polarized light exposed obliquely, or at least partially linearly polarized light. Especially, most preferred aligning light denotes substantially polarised light, especially linearly polarised light; or aligning light denotes non-polarised light, which is applied by an oblique irradiation.

In case the aligning light is linearly polarized, the polarization plane of the aligning light shall mean the plane defined by the propagation direction and the polarization direction of the aligning light. In case the aligning light is elliptically polarized, the polarization plan shall mean the plane defined by the propagation direction of the light and by the major axis of the polarization ellipse.

More preferably, the aligning light is UV light, preferably linearly polarized UV light.

Thus, for the production of orienting layers in regions which are limited selectively by area, a solution of the photoaligning polymer material according to the present invention can be applied. For example, firstly be produced and can be spun in a spin-coating apparatus on to a carrier that is optionally coated with an electrode (for example, a glass plate coated with indium-tin oxide (ITO) such that homogeneous layers of 0.05-50 μm thickness result. Subsequently, the regions to be oriented can be exposed e.g. to a mercury high-pressure lamp, a xenon lamp or a pulsed UV laser using a polarizer and optionally a mask in order to form structures. The duration of the exposure depends on the output of the individual lamps and can vary from a few minutes to several hours. The photoreaction can, however, also be effected by irradiating the homogeneous layer using filters which let through e.g. only the radiation which is suitable for the photoreaction.

A preferred method of the invention relates to processes for the preparation of an orienting layer wherein the time is a critical parameter, especially, in which the irradiation time is a critical parameter, such as especially to a roll-to-roll process.

The present invention also relates to orientation layers comprising a photoaligning polymer material, which comprises repeating structural units of formula (I) or monomers of formula (II) or a composition comprising said photoaligning polymer material.

The use of the photoaligning polymer materials in accordance with the present invention as orienting layers for liquid crystals as well as their use in non-structured and structured optical and electro-optical components, especially for the production of hybrid layer elements, is also objects of the present invention.

The term "structured" refers to a variation in the azimuthal orientation, which is induced by locally varying the direction of the polarized aligning light.

Further, the present invention relates to optical, electro-optical or nanoelectrical elements or multi-layer systems comprising the photoaligning polymer material comprising the repeating structural elements according to formula (I) or monomers of formula (II) or/and a composition comprising the photoaligning polymer material comprising the repeating structural elements according to formula (I) or monomers of formula (II) or/and an orientation layer prepared by using the photoaligning polymer material comprising the repeating structural elements of formula (I) or monomers of formula (II).

Such optical, electro-optical, multi-layer systems or nano-electrical elements are also called photo-alignable objects. Such photo-alignable objects have been described in non-published application EP16182085.7 and in published application WO2015/024810, which are incorporated herein by reference.

In addition, the present invention relates to the use of the photoaligning polymer material according to the present invention as an orienting layer, for aligning organic or inorganic compounds, especially for aligning liquid crystals and liquid crystal polymers.

The present invention also relates to the use of the orienting layer according to the present invention in the manufacture of optical or electro-optical component and systems, especially multilayer systems, or devices for the preparation of a display waveguide, a security or brand protection element, a bar code, an optical grating, a filter, a retarder, such as 3D-retarder films, a compensation film, a reflectively polarizing film, an absorptive polarizing film, an anisotropically scattering film compensator and retardation film, a twisted retarder film, a cholesteric liquid crystal film, a guest-host liquid crystal film, a monomer corrugated film, a smectic liquid crystal film, a polarizer, a piezoelectric cell, a thin film exhibiting non linear optical properties, a decorative optical element, a brightness enhancement film, a component for wavelength-band-selective compensation, a component for multi-domain compensation, a component of multiview liquid crystal displays, an achromatic retarder, a polarization state correction/adjustment film, a variable transmissive film, a component of optical or electro-optical sensors, a component of brightness enhancement film, a component for light-based telecommunication devices, a G/H-polarizer with an anisotropic absorber, a reflective circular polarizer, a reflective linear polarizer, a MC (monomer corrugated film), liquid crystal displays, especially twisted nematic (TN) liquid crystal displays, hybrid aligned nematic (HAN) liquid crystal displays, electrically controlled birefringence (ECB) liquid crystal displays, supertwisted nematic (STN) liquid crystal displays, optically compensated birefringence (OCB) liquid crystal displays, pi-cell liquid crystal displays, in-plane switching (IPS) liquid crystal displays, fringe field switching (FFS) liquid crystal displays, vertically aligned (VA) liquid crystal displays; all above display types are applied in either transmissive or reflective or transflective mode.

The optical or electro-optical component and systems, especially multilayer systems and devices can be patterned or unpatterned.

The term patterning preferably denotes to birefringence patterning and/or thickness patterning and/or patterning of the optical axis orientation, and/or patterning of the degree of polymerization. Birefringence denotes the difference between the extra-ordinary and the ordinary index of refraction.

Thus the invention further relates to optical or electro-optical elements, systems and devices device comprising the photoaligning polymer material or composition comprising said photoaligning polymer material within the above given meaning and preferences.

Preferred are optical or electro-optical elements, systems and devices comprising orienting layers according to the present invention and at least one orientable layer, such as a liquid crystal layer or liquid crystal polymer layer.

An optical component, system or device creates, manipulates, or measures electromagnetic radiation.

An electro-optical component, system or device operates by modification of the optical properties of a material by an electric field. Thus it concerns the interaction between the electromagnetic (optical) and the electrical (electronic) states of materials.

The orienting layer has the ability to align slave materials, such as for example liquid crystals, such as nematic liquid crystals, with their long axis along a preferred direction.

The present invention also relates to the use of the orienting layer according to the present invention, for aligning slave material. A "slave material" shall refer to any material that has the capability to establish anisotropy upon contact with a photo-aligned material. The nature of the anisotropy in the photo-aligned material and in the slave material may be different from each other. Examples of slave materials are liquid crystals. Such slave materials are applied on top of an orienting layer. The slave material may be applied by coating and/or printing with or without solvent and may be applied over the full orienting layer of only on parts of it. The slave material may be polymerized by thermal treatment or exposure to actinic light. Polymerization may be performed under inert atmosphere, such as nitrogen, or under vacuum. The slave material may further contain isotropic or anisotropic dyes and/or fluorescent dyes.

A slave material may comprise polymerizable and/or non-polymerizable compounds. Within the context of the present invention the terms "polymerizable" and "polymerized" shall include the meaning of "cross-linkable" and "cross-linked", respectively. Likewise "polymerization" shall include the meaning of "cross-linking".

A liquid crystal polymer (LCP) material as used within the context of the present application shall mean a liquid crystal material, which comprises liquid crystal monomers and/or liquid crystal oligomers and/or liquid crystal polymers and/or cross-linked liquid crystals. In case the liquid crystal material comprises liquid crystal monomers, such monomers may be polymerized, typically after anisotropy has been created in the LCP material due to contact with a photo-aligning polymer material of a composition comprising the photo-aligning polymer material according to the present invention. Polymerization may be initiated by thermal treatment or by exposure to actinic light, which preferably comprises UV-light. A LCP-material may consist of a single type of a liquid crystal compound, but may also be a composition of different polymerizable and/or non-polymerizable compounds, wherein not all of the compounds have to be liquid crystal compounds. Further, an LCP material may contain additives, for examples, a photo-initiator or isotropic or anisotropic fluorescent and/or non-fluorescent dyes.

The term "anisotropy" or "anisotropic" refers to the property of being directionally dependent. Something that is anisotropic may appear different or have different characteristics in different directions. These terms may, for example, refer to the optical absorption, the birefringence, the electrical conductivity, the molecular orientation, the property for alignment of other materials, for example for liquid crystals, or mechanical properties, such as the elasticity modulus. In the context of this application the term "alignment direction" shall refer to the symmetry axis of the anisotropic property.

Preferred is the use for the induction of planar alignment, tilted or vertical alignment of adjacent liquid crystalline layers; more preferred is the use for the induction of planar alignment or vertical alignment in adjacent liquid crystalline layers.

It has surprisingly been found in the present invention that the photoaligning polymer materials comprising the repeating structural units of formula (I) or the monomers of formula (II) according to the present invention have fast orientation and therefore give access to efficient manufacturing processes such as especially roll-to-roll processes. The materials show good orientation properties such as high contrast. They also allow short irradiation times for aligning at very low energies. Very advantageously it was found that these materials can be coated on several substrates such as glass, or flexible substrates such as PET or TAC and herewith lead to huge palette of applicatory possibilities. Furthermore it has been found that the photoaligning materials of the invention have a very good compatibility with various solvents allowing high flexibility for coating and printing methods. The novel photoaligning polymer materials present very high compatibility with organic materials such as curable compositions or liquid crystal polymerizable giving access to a wide range of optical elements or electro-optical elements which are used for example as security devices, liquid crystal devices (LCD), optical films, such as retarders like 3D retarder and in nanoeletrical devices.

In addition, the photoaligning polymers materials in accordance with the invention show a substantially better orientation of the liquid crystals.

The polymers in accordance with the invention are illustrated in more detail by the following Examples.

EXAMPLES

Example 1

Synthesis of Compound 1.

Preparation of 6-[4-[(E)-3-oxo-3-(2,2,2-trifluoroethoxy)prop-1-enyl]phenoxy]hexyl 2-methylprop-2-enoate

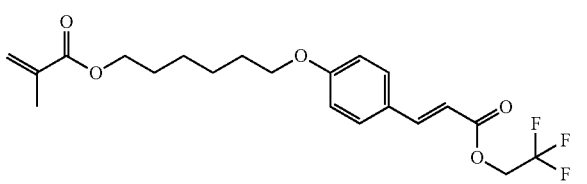 [SMILES: C=C(C)C(=O)OCCCCCCOc1ccc(/C=C/C(=O)OCC(F)(F)F)cc1]

400.1 g of 4-hydroxybenzaldehyde, 588.4 g of potassium carbonate (powder), 40.0 g of potassium iodide and 0.4 g of phenothiazine are suspended in 1600 g of DMF. To this suspension 710.7 g of 6-chlorohexyl 2-methylprop-2-enoate are added. The resulting mixture is then heated up to 85° C. under nitrogen atmosphere. After 18 hours at 85° C. the reaction mixture is cooled down to 20° C. and filtered over Hyflo. The remaining solid is washed with 400 g of DMF. The resulting DMF solution is transferred in a reactor. To this solution 0.6 g of phenothiazine, 0.6 g pf BHT, 727.98 g of propanedioic acid, 1-(2,2,2-trifluoroethyl) ester in 250 g of DMF and 114 g of morpholine are added. The reaction mixture is then stirred under nitrogen at 50° C. After 6 hours the reaction is cooled down to RT, and then isopropanol is added. Water is then added dropwise to precipitate the product out of the orange solution. After filtration and washing 1080 g of Compound 2 are obtained as a white solid with an HPLC purity of >97%.

1H NMR (300 MHz) in CDCl3 of compound 2: 7.75 (d, 1H), 7.51 (d, 2H), 6.91 (d, 2H), 6.35 (d, 1H), 6.11 (m, 1H), 5.56 (m, 1H), 4.60 (dd, 2H), 4.18 (t, 2H), 4.02 (t, 2H), 1.96 (m, 3H), 1.84 (m, 2H), 1.74 (m, 2H), 1.51 (m, 4H).

Example 2

Synthesis of Compound 2

Preparation of 6-[2-methoxy-4-[(E)-3-oxo-3-(2,2,2-trifluoroethoxy)prop-1-enyl]phenoxy]hexyl 2-methylprop-2-enoate

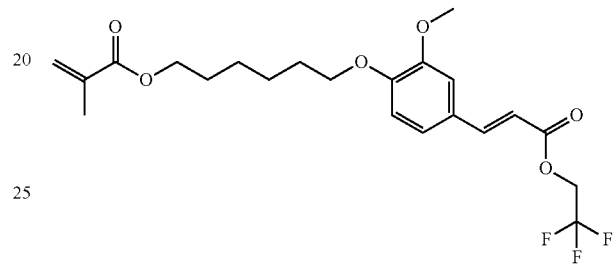

Similarly to the previous example, the condensation of 6-chlorohexyl 2-methylprop-2-enoate with vanillin, followed by the condensation with propanedioic acid, 1-(2,2,2-trifluoroethyl) ester lead to the synthesis of Compound 2 in 78% yield with an HPLC purity of >97%.

1H NMR (300 MHz) in DMSO-d6 of Compound 3: 7.70 (d, 1H), 7.42 (d, 1H), 7.26 (d, 1H), 6.98 (d, 1H), 6.68 (d, 1H), 6.02 (m, 1H), 5.66 (m, 1H), 4.85 (dd, 2H), 4.10 (t, 2H), 4.03 (t, 2H), 3.81 (s, 3H), 1.88 (m, 3H), 1.72 (m, 2H), 1.64 (m, 2H), 1.43 (m, 4H).

Example 3

Synthesis Example of Compound 3

Preparation of 8-[2-methoxy-4-[(E)-3-oxo-3-(2,2,2-trifluoroethoxy)prop-1-enyl]phenoxy]octyl 2-methylprop-2-enoate

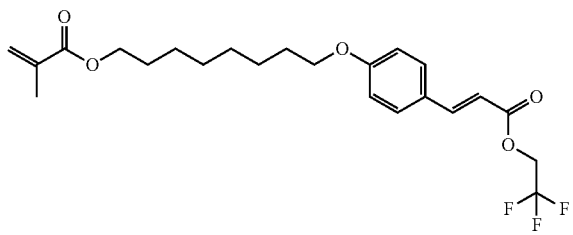 [SMILES: C=C(C)C(=O)OCCCCCCCCOc1ccc(/C=C/C(=O)OCC(F)(F)F)cc1]

Similarly to examples 1 and 2, the condensation of 8-chlorooctyl 2-methylprop-2-enoate with 4-hydroxybenzaldehyde, followed by the condensation with propanedioic acid, 1-(2,2,2-trifluoroethyl) ester resulted in the synthesis of Compound 3 in 70% yield with an HPLC purity of >97%.

1H NMR (300 MHz) in CDCl3 of Compound 4: 7.73 (d, 1H), 7.47 (d, 2H), 6.91 (d, 2H), 6.35 (d, 1H), 6.09 (m, 1H), 5.56 (m, 1H), 4.57 (dd, 2H), 4.14 (t, 2H), 3.98 (t, 2H), 1.94 (m, 3H), 1.77 (m, 2H), 1.68 (m, 2H), 1.45 (m, 8H).

Example 4

Synthesis of Compound 4

Preparation of 8-[2-methoxy-4-[(E)-3-oxo-3-(2,2,2-trifluoroethoxy)prop-1-enyl]phenoxy]octyl 2-methylprop-2-enoate

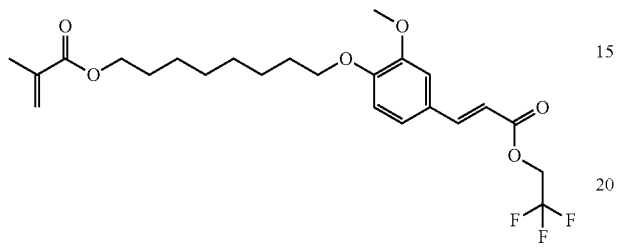

As described for Compound 2, the condensation of 8-chlorooctyl 2-methylprop-2-enoate with vanillin, followed by the condensation with propanedioic acid, 1-(2,2,2-trifluoroethyl) ester lead to Compound 4 in 60% yield with an HPLC purity of >95%.

1H NMR (300 MHz) in DMSO-d6 of Compound 5: 7.70 (d, 1H), 7.42 (d, 1H), 7.30 (d, 1H), 7.00 (d, 1H), 6.70 (d, 1H), 6.01 (m, 1H), 5.66 (m, 1H), 4.85 (dd, 2H), 4.10 (t, 2H), 3.99 (t, 2H), 3.80 (s, 3H), 1.87 (m, 3H), 1.72 (m, 2H), 1.61 (m, 2H), 1.33 (m, 8H).

Example 5

Synthesis of Compound 5

Preparation of [2-methoxy-4-[(E)-3-oxo-3-(2,2,2-trifluoroethoxy)prop-1-enyl]phenyl]4-(6-prop-2-enoyloxyhexoxy)benzoate

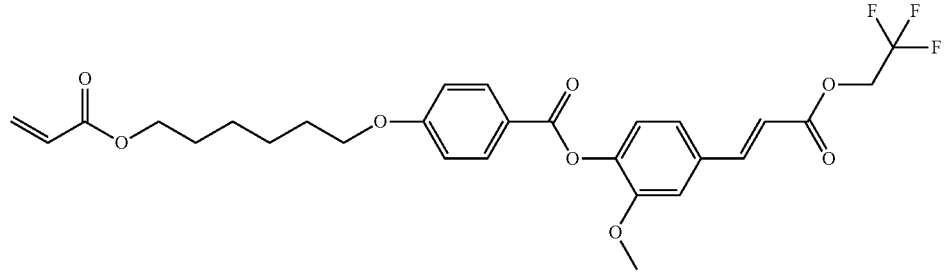 [SMILES: C=CC(=O)OCCCCCCOc1ccc(C(=O)Oc2ccc(/C=C/C(=O)OCC(F)(F)F)cc2OC)cc1]

As described for Compound 2, the condensation of 8-chlorooctyl 2-methylprop-2-enoate with (4-formyl-2-methoxy-phenyl) 4-hydroxybenzoate, followed by the condensation with propanedioic acid, 1-(2,2,2-trifluoroethyl) ester lead to Compound 5 in 76% yield with an HPLC purity of >93%.

1H NMR (300 MHz) in DMSO-d6 of Compound 6: 8.06 (d, 2H), 7.83 (d, 1H), 7.78 (s, 1H), 7.40 (d, 1H), 7.30 (d, 1H), 7.11 (d, 2H), 6.90 (d, 1H), 6.30 (d, 1H), 6.20 (dd, 1H), 5.95 (d, 1H), 4.90 (dd, 2H), 4.10 (m, 4H), 3.83 (s, 3H), 1.77 (m, 2H), 1.65 (m, 2H), 1.44 (m, 4H).

Example 6

Synthesis of Poly-6-[4-[(E)-3-oxo-3-(2,2,2-trifluoroethoxy)prop-1-enyl]phenoxy]hexyl 2-methylprop-2-enoate

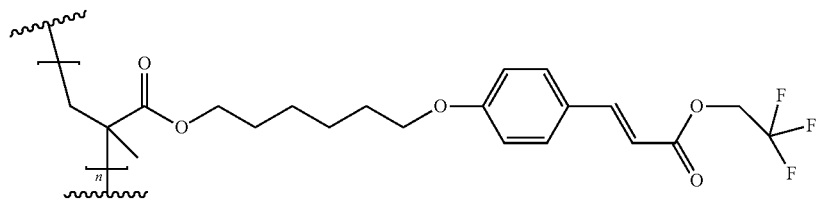

25 g of monomeric Compound 1 as synthesized in Example 1 are dissolved in cyclohexanone (CHN) under stirring in nitrogen atmosphere. The reaction mixture is then heated up to 75° C. and then 0.4 g of Luperox® LP (Lauryl peroxide) are added. The reaction mixture is then maintained at 75° C. for 5 hours then the temperature is increased to 100° C. After 1 hour at 100° C. the reaction mixture is cooled down to RT and then filtered to obtain the polymer in CHN solution (Mw=151000 and Mn=41800). This photoaligning polymer material is named PAM1.

Example 7

Synthesis of a copolymer of 6-[4-[(E)-3-oxo-3-(2,2,2-trifluoroethoxy)prop-1-enyl]phenoxy]hexyl 2-methylprop-2-enoate and 6-[4-[(E)-3-methoxy-3-oxo-prop-1-enyl]phenoxyhexyl 2-methylprop-2-enoate

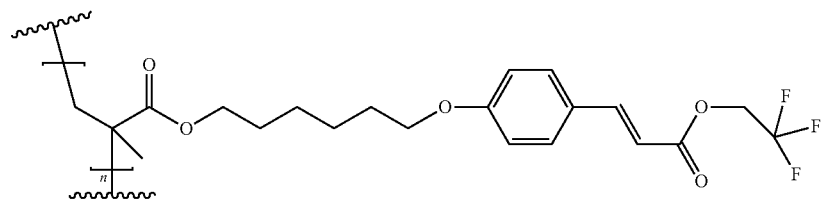

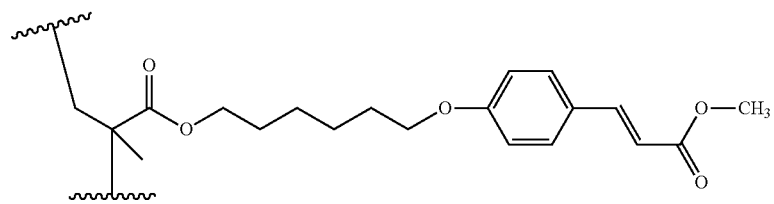 [SMILES: *CCC(*)(C)C(=O)OCCCCCCOc1ccc(/C=C/C(=O)OC)cc1]

The copolymer is prepared according to the process described for Example 1 by using 14 g of Compound 1, 11 g of 6-[4-[(E)-3-methoxy-3-oxo-prop-1-enyl]phenoxyhexyl 2-methylprop-2-enoate in 100 g of CHN and 0.4 g of Luperox® LP. The copolymer is obtained in CHN solution (Mw=123200 and Mn=39500). This photoaligning polymer material is named PAM2.

Example 8

Synthesis of Comparative Photoalignment Polymers

Photoaligning polymer material 3 (PAM3) has been synthesized as described in patent application WO2012/085048 A1.

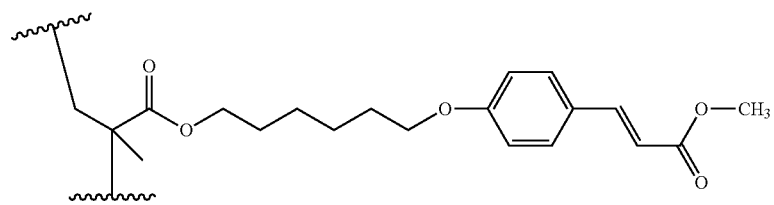

Photoaligning polymer material 4 (PAM4) has been synthesized as described in Example A4 in patent application WO2015/024810 A1.

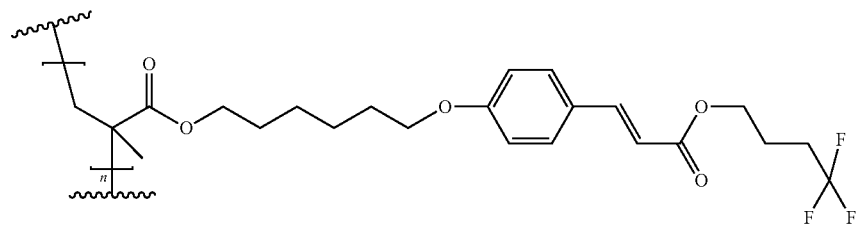

Photoaligning polymer material 5 (PAM5) has been synthesized as described in patent application JP 2005-326439 A.

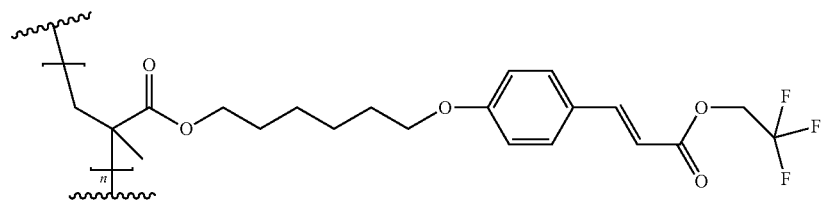

Photoaligning polymer material 6 (PAM6) has been synthesized in a similar way as described in example 2 of the patent application WO2012/085048 A1.

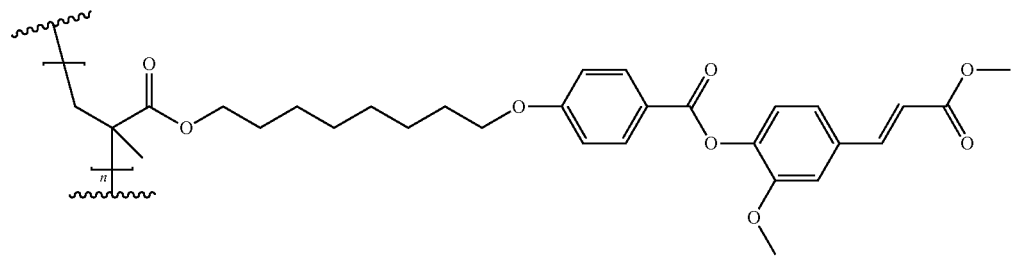

Example 9

Synthesis of Poly-6-[2-methoxy-4-[(E)-3-oxo-3-(2,2,2-trifluoroethoxy)prop-1-enyl]phenoxy]hexyl 2-methylprop-2-enoate

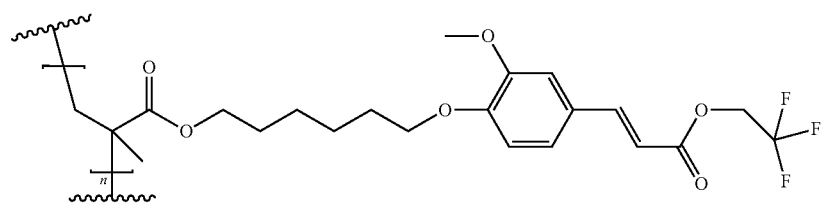

According to the process described for Example 6, the polymer is obtained in CHN solution by using monomeric Compound 2 (Mw=160700 and Mn=59500). This photoaligning polymer material is named PAM7.

Example 10

Synthesis of Poly-8-[2-methoxy-4-[(E)-3-oxo-3-(2,2,2-trifluoroethoxy)prop-1-enyl]phenoxy]octyl 2-methylprop-2-enoate

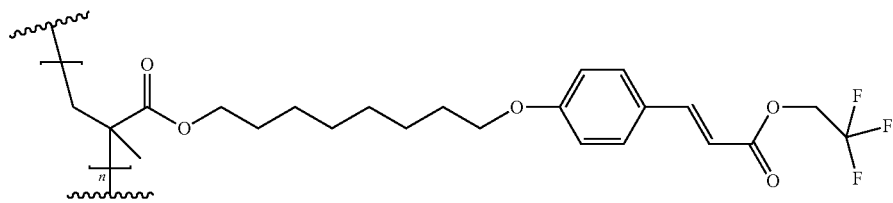

According to the process described for Example 6, the polymer is obtained in CHN solution by using monomeric Compound 3 (Mw=131600 and Mn=53200). This photoaligning polymer material is named PAM8.

Example 11

Synthesis of Poly-8-[2-methoxy-4-[(E)-3-oxo-3-(2,2,2-trifluoroethoxy)prop-1-enyl]phenoxy]octyl 2-methylprop-2-enoate

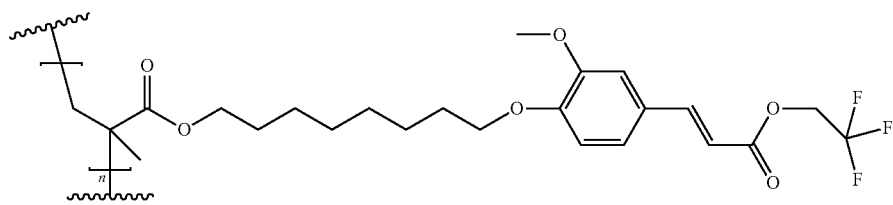

According to the process described for Example 6, the polymer is obtained in CHN solution by using monomeric Compound 4 (Mw=212100 and Mn=66100). This photoaligning polymer material is named PAM9.

Example 12

Synthesis of Poly-[2-methoxy-4-[(E)-3-oxo-3-(2,2,2-trifluoroethoxy)prop-1-enyl]phenyl]4-(6-prop-2-enoyloxyhexoxy)benzoate

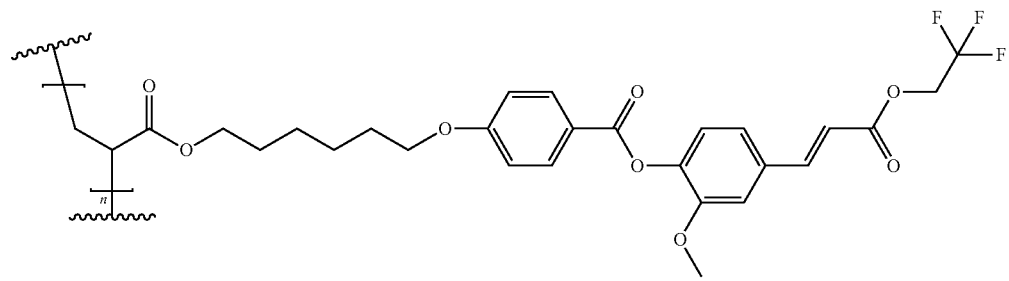

According to the process described for Example 6, the polymer is obtained in CHN solution by using monomeric Compound 5 (Mw=228000 and Mn=32900). This photoaligning polymer material is named PAM10.

Example 13

Preparation of Photoaligning Composition 1 (PAC1)

The solution PAC1 is prepared by adding 3 wt % of the photoalignment material PAM1 in 97 wt % of methoxypropylacetate and stirring the mixture for 30 minutes at room temperature.

Example 14

Preparation of Photoaligning Composition 2 (PAC2)

The solution PAC2 is prepared by adding 3 wt % of the photoalignment material PAM3 in 97 wt % of methoxypropylacetate and stirring the mixture for 30 minutes at room temperature.

Example 15

Preparation of Photoaligning Composition 3 (PAC3)

The solution PAC3 is prepared by adding 2 wt % of the photoalignment material PAM6 in 98 wt % of methoxypropylacetate and stirring the mixture for 30 minutes at room temperature.

Example 16

Preparation of Photoaligning Composition 4 (PAC4)

The solution PAC4 is prepared by adding 3 wt % of the photoalignment material PAM4 in 97 wt % of methoxypropylacetate and stirring the mixture for 30 minutes at room temperature.

Example 17

Preparation of Photoaligning Composition 5 (PAC5)

The solution PAC5 is prepared by adding 3 wt % of the photoalignment polymer PAM5 in 97 wt % of methoxypropylacetate and stirring the mixture for 30 minutes at room temperature.

Example 18

Preparation of Photoaligning Composition 6 (PAC6)

The solution PAC6 is prepared by adding 3 wt % of the photoalignment polymer PAM7 in 97 wt % of methoxypropylacetate and stirring the mixture for 30 minutes at room temperature.

Example 19

Preparation of Photoaligning Composition 7 (PAC7)

The solution PAC7 is prepared by adding 3 wt % of the photoalignment polymer PAM8 in 97 wt % of methoxypropylacetate and stirring the mixture for 30 minutes at room temperature.

Example 20

Preparation of Photoaligning Composition 8 (PAC8)

The solution PAC8 is prepared by adding 3 wt % of the photoalignment polymer PAM9 in 97 wt % of methoxypropylacetate and stirring the mixture for 30 minutes at room temperature.

Example 21

Preparation of Photoaligning Composition 9 (PAC9)

The solution PAC9 is prepared by adding 3 wt % of the photoalignment polymer PAM10 in 97 wt % of methoxypropylacetate and stirring the mixture for 30 minutes at room temperature.

Examples 22-33

Preparation of Photo-Orientable Materials.
Following curable compositions were prepared:
Curable Composition 1 (CC1) is prepared by mixing 20 wt % of:

| | |
|---|---|
| 55.95% | Laromer 9050 (BASF) |
| 37.90% | 1,6-Hexanediol-diacrylate (Sigma Aldrich) |
| 5.05% | Irgacure 907 (BASF) |
| 1.00% | Tinuvin 144 (BASF) |
| 0.10% | BHT (Sigma Aldrich) | in n-Butylacetate (BA) and stirring 30 minutes at RT.

The Curable Composition 2 (CC2) was prepared by mixing 20 wt % of OC-4021 (DYMAX) in n-Butylacetate (BA) and stirring 30 minutes at RT.

Example 22

Preparation of Photo-Orientable Material 1 (POM1)

The photo-orienting solution POM1 is prepared by mixing 1 wt % of the photoalignment material PAM1 in CC1 and stirring the mixture for 30 minutes at room temperature.

Example 23

Preparation of Photo-Orientable Material 2 (POM2)

The photo-orienting solution POM2 is prepared by mixing 1 wt % of the photoalignment material PAM5 in CC1 and stirring the mixture for 30 minutes at room temperature.

Example 24

Preparation of Photo-Orientable Material 3 (POM3)

The photo-orienting solution POM3 is prepared by mixing 1 wt % of the photoalignment material PAM4 in CC1 and stirring the mixture for 30 minutes at room temperature.

Example 25

Preparation of Photo-Orientable Material 4 (POM4)

The photo-orienting solution POM4 is prepared by mixing 1 wt % of the photoalignment material PAM2 in CC1 and stirring the mixture for 30 minutes at room temperature.

Example 26

Preparation of Photo-Orientable Material 5 (POM5)

The photo-orienting solution POM5 is prepared by mixing 1 wt % of the photoalignment material PAM1 in CC2 and stirring the mixture for 30 minutes at room temperature.

Example 27

Preparation of Photo-Orientable Material 6 (POM6)

The photo-orienting solution POM6 is prepared by mixing 1 wt % of the photoalignment material PAM4 in CC2 and stirring the mixture for 30 minutes at room temperature.

Example 28

Preparation of Photo-Orientable Material 7 (POM7)

The photo-orienting solution POM7 is prepared by mixing 1 wt % of the photoalignment material PAM8 in CC2 and stirring the mixture for 30 minutes at room temperature.

Example 29

Preparation of Photo-Orientable Material 8 (POM8)

The photo-orienting solution POM7 is prepared by mixing 1 wt % of the photoalignment material PAM7 in CC2 and stirring the mixture for 30 minutes at room temperature.

Example 30

Preparation of Photo-Orientable Material 9 (POM9)

The photo-orienting solution POM7 is prepared by mixing 2 wt % of the photoalignment material PAM7 in CC2 and stirring the mixture for 30 minutes at room temperature.

Example 31

Preparation of Photo-Orientable Material 10 (POM10)

The photo-orienting solution POM7 is prepared by mixing 1 wt % of the photoalignment material PAM9 in CC2 and stirring the mixture for 30 minutes at room temperature.

Example 32

Preparation of Photo-Orientable Material 11 (POM11)

The photo-orienting solution POM7 is prepared by mixing 2 wt % of the photoalignment material PAM9 in CC2 and stirring the mixture for 30 minutes at room temperature.

Example 33

Preparation of Photo-Orientable Material 12 (POM12)

The photo-orienting solution POM7 is prepared by mixing 1 wt % of the photoalignment material PAM10 in CC2 and stirring the mixture for 30 minutes at room temperature.

Examples 34-40

Preparation of the compositions comprising the Polymerizable Liquid Crystal and the Photo Orientable Material (PLCPO-M1-PCLPO-M7).

All compositions comprise:

| | | |
|---|---|---|
| 97.775% | LCC2 | |
| 1.000% | Irgacure 907 | (BASF) |
| 0.200% | Tinuvin 123 | (BASF) |
| 0.025% | BHT | (Sigma Aldrich) |
| 1.000% | PAM | |

LCC2:
O5-[4-[3-methyl-4-[4-[5-oxo-5-(2-prop-2-enoyloxy-ethoxy)pentanoyl]oxybenzoyl]oxy-phenoxy]carbonylphenyl]O1-(2-prop-2-enoyloxyethyl) pentanedioate

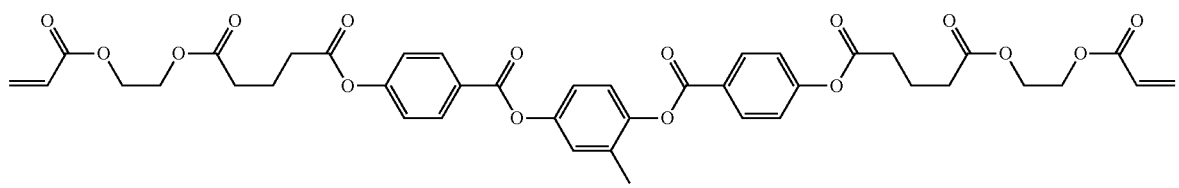 [SMILES: C=CC(=O)OCCOC(=O)CCCC(=O)Oc1ccc(C(=O)Oc2ccc(OC(=O)c3ccc(OC(=O)CCCC(=O)OCCOC(=O)C=C)cc3)c(C)c2)cc1]

Example 34

PLCPO-M1 contains 1% of PAM1.

Example 35

PLCPO-M2 contains 1% of PAM4.

Example 36

PLCPO-M3 contains 1% of PAM5.

Example 37

PLCPO-M4 contains 1% of PAM8.

Example 38

PLCPO-M5 contains 1% of PAM7.

Example 39

PLCPO-M6 contains 1% of PAM9.

Example 40

PLCPO-M7 contains 1% of PAM10.

The different PLCPO-Ms were dissolved in a solvent mixture of 20% Butylacetate and 80% cyclohexanone and stirred the mixture for 30 minutes at room temperature in a 35:65 ratio.

APPLICATION EXAMPLES

Example 41

Preparation of a Primer Coated Substrate

A triacetate cellulose (TAC) foil was coated by means of Kbar coater (bar size 1) with a primer solution (DYMAX OC-4021). The film was dried at 80° C. for 30 s and the thickness of the resulting film was about 2 μm. Then the film was exposed to UV light (1500 mJ, under nitrogen atmosphere).

Example 42

Preparation of an Orientation Layer Using Photoalignment Materials

A primer coated TAC substrate of Application Example 1 was Kbar coated (bar size 0) with a Photoalignment Composition (PAC). The film was dried at 80° C. for 30 s and the resulting film thickness was about 100 nm. Then the film was exposed to aligning light, which was collimated and linearly polarized UV (LPUV) light (280-320 nm) with various exposure energy from 10 to 100 mJ/cm². The plane of polarization was 0° with regard to a reference edge on the TAC substrate.

Example 43

Preparation of an Orientation Layer Using Photo Orientable Materials

A triacetate cellulose (TAC) foil was coated by means of Kbar coater (bar size 0) with a POM solution. The film was dried at 80° C. for 60 s; the thickness of the resulting film was about 2 μm. Then the film was exposed to UV light (500 mJ under nitrogen atmosphere for curable composition CC1 and 1500 mJ under nitrogen atmosphere for curable composition CC2). The film was then exposed to aligning light, which was collimated and linearly polarized UV (LPUV) light (280-320 nm) with various exposure energy from 10 to 100 mJ/cm². The plane of polarization was 0° with regard to a reference edge on the TAC substrate.

Example 44

Preparation of an Orientation Layer Using Polymerizable Liquid Crystal and Photo Orientable Material An orientation layer as of Application Example 2 was prepared with a plane of polarization of 20° with regard to a reference edge of the primer coated substrate (Application Example 1). This layer was Kbar coated (bar size 2) with a PLCPO-M solution (produced as described above). The layer was dried at 50° C. for 60 s and subsequently the liquid crystals were cross-linked at room temperature under nitrogen atmosphere by UV-A light exposure 200 mJ/cm². The PLCPO-M layer was then exposed to collimated LPUV light (280-320 nm) with various exposure energy from 10 to 100 mJ/cm2. The plane of polarization was 80° with regard to a reference edge on the TAC substrate.

Example 45

Preparation of an LCP Layer Aligned by the Orientation Layer

An LCP layer is prepared on top of the orientation layer of examples 42, 43 or 44 by Kbar coating (bar size 1) the LCP solution S-LCC1. The wet layer was dried at 50° C. for 60 s and subsequently the liquid crystals are cross-linked at room temperature under nitrogen atmosphere by UV-A light exposure of 30 mW/cm$_2$ for 50 seconds.

Following crosslinkable liquid crystal compound (LCC) was used: LCC1:

pentyl 2,5-bis[[4-(6-prop-2-enoyloxyhexoxy)benzoyl]oxy]benzoate

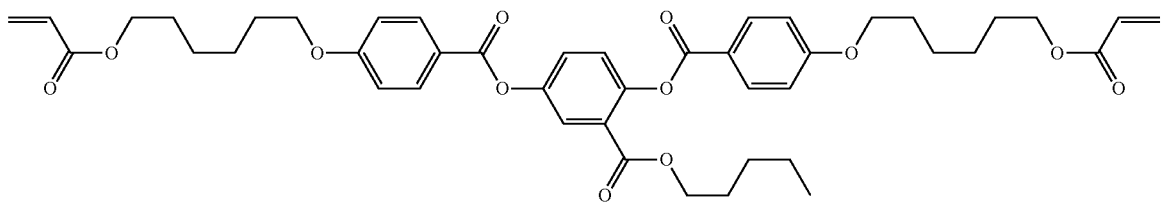 [SMILES: C=CC(=O)OCCCCCCOc1ccc(C(=O)Oc2ccc(OC(=O)c3ccc(OCCCCCCOC(=O)C=C)cc3)c(C(=O)OCCCCC)c2)cc1]

The solution S-LCC1 is prepared by dissolving 35 wt % of

| | | |
|---|---|---|
| 98.525% | LCC1 | |
| 1.00% | Irgacure 907 | (BASF) |
| 0.20% | Tinuvin 123 | (BASF) |
| 0.25 | Tegoflow 300 | (Evonik) |
| 0.025% | BHT | (Sigma Aldrich) | in 65 wt % of a solvent mixture of 80% n-butylacetate and 20% Cyclohexanone and stirring the mixture for 30 minutes at room temperature.

Examples 46-48

Evaluation of the Quality of Orientation

For an efficient manufacturing process it is of interest to know how much exposure energy does a photo-alignment layer require to achieve a good visible and homogeneous (without any visible defect) contrast in a LCP layer aligned by the orientation layer. The films produced have been analysed between crossed polarizers. Alignment quality has been ranked as the following:

▲▲ very good alignment homogeneous orientation
▲ good orientation (disclination lines (DL's) area<2% of coating area)
○ few DL's (<10% of coating area)
× DL's visible (>10% of coating area)
×× inhomogeneous orientation or no orientation Example 46

Optical devices have been produced by the following sequence: a primer coated substrate (as produced in Application Example 41) has been coated by an orientation layer using PAM materials (as described in Application Example 42) and orienting an LCP layer (as shown in Application Example 45). Various exposure energies have been used to orient the PAM materials. Summary of the results are shown in the Table 1 below. The results show that the compounds according to the present invention orient the liquid crystals at lower energy compared e.g. to the compound according to the prior art.

TABLE 1

| | LPUV dosage (mJ/cm$^2$) | | | | | | | | | | | | |
|---|---|---|---|---|---|---|---|---|---|---|---|---|---|
| | 10 | 20 | 30 | 40 | 50 | 60 | 70 | 80 | 90 | 100 | 150 | 200 | 250 |
| PAM1 | xx | xx | x | ▲▲ | ▲▲ | ▲▲ | ▲▲ | ▲▲ | ▲▲ | ▲▲ | ▲▲ | ▲▲ | ▲▲ |
| PAM4 | xx | xx | xx | xx | xx | xx | xx | x | x | x | | | |
| PAM5 | xx | xx | x | ▲▲ | ▲▲ | ▲▲ | ▲▲ | ▲▲ | ▲▲ | ▲▲ | ▲▲ | ▲▲ | ▲▲ |
| PAM7 | xx | x | x | ▲▲ | ▲▲ | ▲▲ | ▲▲ | ▲▲ | ▲▲ | ▲▲ | ▲▲ | ▲▲ | ▲▲ |
| PAM8 | xx | x | ▲▲ | ▲▲ | ▲▲ | ▲▲ | ▲▲ | ▲▲ | ▲▲ | ▲▲ | ▲▲ | ▲▲ | ▲▲ |
| PAM9 | xx | xx | xx | x | x | ▲▲ | ▲▲ | ▲▲ | ▲▲ | ▲▲ | ▲▲ | ▲▲ | ▲▲ |
| PAM10 | xx | xx | x | x | ▲▲ | ▲▲ | ▲▲ | ▲▲ | ▲▲ | ▲▲ | ▲▲ | ▲▲ | ▲▲ |

Example 47

Optical devices have been produced by the following sequence: an orientation layer was prepared as described in Example 43 using POM materials, followed by coating and orienting an LCP layer (as shown in Example 45). Various exposure energies have been used to orient the POM materials. Summary of the results are shown in the Table 2 below. The results show that the compounds according to the present invention orient the liquid crystals at lower energy compared e.g. to the compound according to the prior art. Further the results demonstrate that the compounds (homopolymers or copolymers) according to the present invention are suited for the orientation in different curable compositions

TABLE 2

| | LPUV dosage (mJ/cm$^2$) | | | | | | | | | | | |
|---|---|---|---|---|---|---|---|---|---|---|---|---|
| | 10 | 20 | 25 | 40 | 50 | 60 | 70 | 80 | 90 | 100 | 150 | 200 |
| POM1 | xx | x | x | ○ | ▲▲ | ▲▲ | ▲▲ | ▲▲ | ▲▲ | ▲▲ | ▲▲ | ▲▲ |
| POM3 | xx | xx | xx | x | x | x | ▲ | ▲▲ | ▲▲ | ▲▲ | ▲▲ | ▲▲ |
| POM4 | xx | xx | x | ▲ | ▲▲ | ▲▲ | ▲▲ | ▲▲ | ▲▲ | ▲▲ | ▲▲ | ▲▲ |
| POM5 | xx | xx | x | ▲▲ | ▲▲ | ▲▲ | ▲▲ | ▲▲ | ▲▲ | ▲▲ | ▲▲ | ▲▲ |
| POM6 | xx | x | x | ○ | ▲ | ▲ | ▲ | ▲ | ▲▲ | ▲▲ | ▲▲ | ▲▲ |
| POM7 | xx | xx | x | ▲▲ | ▲▲ | ▲▲ | ▲▲ | ▲▲ | ▲▲ | ▲▲ | ▲▲ | ▲▲ |

Example 48

Optical devices have been produced by the following sequence: a primer coated substrate (as produced in Example 41) has been coated by an orientation layer using PAM2 material (as described in Example 42 and with 100 mJ/cm² as LPUV dosage) an orientation layer using PLCPO materials was prepared as described in Example 44, followed by the coating and orienting an LCP layer (as shown in Example 45). Various exposure energies have been used to orient the PLCPO layer. Summary of the results are shown in the Table 3 below. The results show that the compounds according to the present invention achieve a better orientation compared to the compounds of the prior art.

TABLE 3

| | LPUV dosage (mJ/cm2) | | | | | | | | | | | | |
|---|---|---|---|---|---|---|---|---|---|---|---|---|---|
| | 10 | 20 | 30 | 40 | 50 | 60 | 70 | 80 | 90 | 100 | 150 | 200 | 250 |
| PLCPO-M1 | xx | x | ▲▲ | ▲▲ | ▲▲ | ▲▲ | ▲▲ | ▲▲ | ▲▲ | ▲▲ | ▲▲ | ▲▲ | ▲▲ |
| PLCPO-M2 | xx | xx | xx | xx | x | ▲▲ | ▲▲ | ▲▲ | ▲▲ | ▲▲ | ▲▲ | ▲▲ | ▲▲ |
| PLCPO-M3 | xx | xx | xx | xx | x | x | x | x | x | x | x | ▲▲ | ▲▲ |
| PLCPO-M4 | xx | x | x | ▲▲ | ▲▲ | ▲▲ | ▲▲ | ▲▲ | ▲▲ | ▲▲ | ▲▲ | ▲▲ | ▲▲ |
| PLCPO-M7 | ▲▲ | ▲▲ | ▲▲ | ▲▲ | ▲▲ | ▲▲ | ▲▲ | ▲▲ | ▲▲ | ▲▲ | ▲▲ | ▲▲ | ▲▲ |

Example 49

A liquid crystal cell is prepared wherein the liquid crystal is aligned by photoalignment material PAM1 and the electric field is applied between two plan electrodes on each side of the cell gap.

A 6 wt % solution is prepared by mixing the photoalignment material PAM in CHN (cyclohexanone). The above polymer solution was spin-coated onto the two ITO coated glass substrates at a spin speed of 1000 rpm for 30 seconds. After spin coating the substrates are subjected to baking at a temperature of 100° C. for 4 minutes. The resulting layer thickness is around 300 nm. The substrates with the coated polymer layer on top are exposed to linearly polarized UV light (LPUV) at an incidence angle of 60° relative to the normal of the substrate surface. The plane of polarization was within the plane spanned by the substrate normal and the propagation direction of the light. The applied exposure dose is 200 mJ/cm² or 250 mJ/cm². After LPUV exposure, a cell is assembled with the 2 substrates, the exposed polymer layers facing to the inside of the cell. The substrates are adjusted relative to each other such that the induced alignment directions are anti-parallel to each other. The cell is capillary filled with liquid crystal MLC7067 (Merck KGA), which had a positive dielectric anisotropy. After that, the cell is annealed at 100° C. for 30 minutes and cooled down to room temperature. Alignment quality of the liquid crystal in the cell is checked by placing the cell between two crossed polarizers and adjusted to obtain dark state. The alignment quality is defined to be good (rating 5), if the dark state show no defects and the liquid crystal is well oriented. The alignment quality is defined to be medium (rating 3) if the dark state has light leakage because of slight inhomogeneous orientation of liquid crystal in some areas of the cell. The alignment quality is defined to be worse (rating 0), if liquid crystal is not oriented with absence of dark state.

Cells are prepared with PAM1, PAM7, PAM8, PAM9 and PAM10 according to the process described above. The liquid crystal in all cells showed well defined and homogeneous planar orientation after thermal annealing of the cells. Pre-tilt angles of below 1° are measured using the rotating analyzer method from Shintech. The results are summarized in the Table 4 below.

TABLE 4

| Photoalignment Material | Cell gap (μm) | LPUV dosage (mJ/cm²) | Alignment Quality | Pre-tilt Angle (°) |
|---|---|---|---|---|
| PAM1 | 12.44 | 200 | 5 | 0.46 |
| PAM1 | 12.77 | 250 | 5 | 0.77 |
| PAM6 | 12.78 | 200 | 3 | 0.31 |
| PAM7 | 12.62 | 200 | 5 | 0.13 |
| PAM7 | 12.62 | 250 | 5 | 0.13 |
| PAM8 | 12.35 | 200 | 5 | 0.30 |
| PAM8 | 12.80 | 250 | 5 | 0.73 |
| PAM9 | 12.40 | 200 | 5 | 0.16 |
| PAM9 | 12.59 | 250 | 5 | 0.21 |
| PAM10 | 12.53 | 200 | 5 | 0.09 |
| PAM10 | 12.94 | 250 | 4 | 0.04 |

The results show that all the compounds according to the present invention have a very good alignment quality compared to the compound of the prior art.

Example 50

Adhesion Test

A PET-ITO substrate is removed from its protective liner. The surface is activated by means of a Coronna treatment (300 W, 120 m/min 6×). Right after the activation step, the alignment material is coated onto the substrate by spin-coating (1'000 rpm for 30 s) and a 300 nm thick layer is obtained.

The sample is baked at 100° C. for 4 min and exposed to LPUV at an incidence angle of 50° relative to the normal of the substrate surface. The applied exposure dose is 200 and 250 mJ/cm2.

The adhesion is measured according the cross-test cut described in DIN EN ISO 2409.

The used tape is from Nichiban.

The results are summarized in the Table 5 below:

TABLE 5

| Photoalignment Material | LPUV dosage (mJ/cm²) | Adhesion |
|---|---|---|
| PAM1 | 200 | GT 1 |
| PAM1 | 250 | GT 1 |
| PAM6 | 200 | GT 4 |
| PAM8 | 200 | GT 1 |
| PAM8 | 250 | GT 1 |
| PAM10 | 200 | GT 1 |
| PAM10 | 250 | GT 2 |

The results show that all fluorinated compounds without have a better adhesion parameter compared to the prior art compound.

What is claimed is:

1. A photo-orientable material comprising:
   at least one curable compound that does not comprise any photo-alignable moieties; and
   a photoaligning polymer material having a weight average molecular weight (Mw) of 100,000 to 300,000, and comprising repeating structural units of formula (II):

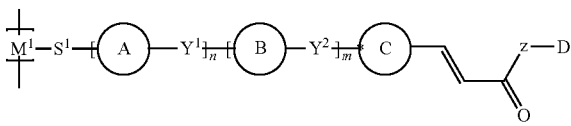

wherein
$M^1$ is a repeating methacrylate monomer unit;
m, n are each independently 0 or 1;
$S^1$ is a spacer unit, wherein, if m and n are 0, then the spacer unit is $S^2$ and if at least one of m or n is 1, then the spacer unit is $S^3$,
wherein $S^2$, $S^3$ are each substituted or unsubstituted, straight-chain or branched: —(CH$_2$)$_r$—, —(CH$_2$)$_r$—O—, —(CH$_2$)$_r$—O—(CH$_2$)$_s$—, —(CH$_2$)$_r$—O—(CH$_2$)$_s$—O—, —(CH$_2$)$_r$—CO—, —(CH$_2$)$_r$—CO—O—, —(CH$_2$)$_r$—O—CO—, —(CH$_2$)$_r$—NR$^2$—, —(CH$_2$)$_r$—CO—NR$^2$—, —(CH$_2$)$_r$—NR$^2$—CO—, —(CH$_2$)$_r$—NR$^2$—CO—O— or —(CH$_2$)$_r$—NR$^2$—CO—NR$^3$—, which is optionally mono- or multiply-substituted with C$_1$-C$_{24}$-alkyl, or hydroxy, fluorine, chlorine, cyano, ether, ester, amino, amido; and wherein one or more —CH$_2$— group(s) may be replaced by at least one linking group, alicyclic and/or aromatic group; in which when r and s are both present, r and s are each a whole number of 1 to 20, with the proviso that 3≤r+s≤24 for $S^2$; and 6≤r+s≤24 for $S^3$; and r is 6 and 10 to 24 when $S^3$ is —(CH$_2$)$_r$—O—; and R$^2$ and R$^3$ each independently signify hydrogen or lower alkyl;
wherein the at least one linking group is selected from —CO—, —OO—O—, —O—CO—, —NR$^1$—, —NR$^1$—CO—, —CO—NR$^1$—, —NR$^1$—CO—O—, —O—CO—NR$^1$—, —NR$^1$—CO—NR$^1$—, —CH═CH—, —C≡C—, —O—CO—O—, and —Si(CH$_3$)$_2$—O—Si(CH$_3$)$_2$—, wherein R$^1$ represents a hydrogen atom or C$_{1-6}$-alkyl, with the proviso that oxygen atoms of linking groups are not directly linked to each other; and
ring A is phenylene which is unsubstituted or substituted with fluorine, chlorine, cyano, alkyl or alkoxyl or pyridine-2,5-diyl; pyrimidine-2,5-diyl; 1,3-dioxane-2,5-diyl; cyclohexane-1,4-diyl; piperidine-1,4-diyl; or piperazine-1,4-diyl;
ring B is phenylene which is unsubstituted or substituted with fluorine, chlorine, cyano, alkyl or alkoxy; or pyridine-2,5-diyl; pyrimidine-2,5-diyl; 1,4- or 2,6-naphthylene;1,3-dioxane-2,5-diyl; or cyclohexane-1,4-diyl;
$Y^1$, $Y^2$ each independently signify a single covalent bond, —(CH$_2$)$_t$—, —O—, —CO—, —CO—O—, —O—OC—, —CF$_2$O—, —OCF$_2$—, —NR$^4$—, —CO—NR$^4$—, —R$^4$N—CO—, —(CH$_2$)$_u$—O—, —O—(CH$_2$)$_u$—, —(CH$_2$)$_u$—NR$^4$— or —NR$^4$—(CH$_2$)$_u$—, in which
R$^4$ signifies hydrogen or lower alkyl;
t signifies a whole number of 1 to 4;
u signifies a whole number of 1 to 3;
ring C is phenylene which is unsubstituted or substituted with fluorine, chlorine, cyano, alkyl or alkoxy; or pyrimidine-2,5-diyl; pyridine-2,5-diyl; 2,5-thiophenylene; 2,5-furanylene; or 1,4- or 2,6-naphthylene;
Z is —O— or —NR$^5$—, in which R$^5$ signifies hydrogen or lower alkyl, or a second group of formula D, in which
D is a 2,2,2-trifluoro-ethyl group.

2. The photo-orientable material of claim 1, wherein the photoaligning polymer material is a homopolymer.

3. The photo-orientable material according to claim 1, wherein
ring A is unsubstituted phenylene or phenylene which is substituted with alkyl or alkoxy;
ring B is unsubstituted phenylene or phenylene which is substituted with fluorine, alkyl or alkoxy;
$Y^1$, $Y^2$ each independently is a single covalent bond, —CO—O—, or —O—OC—;
ring C is unsubstituted phenylene or phenylene which is substituted with alkyl or alkoxy;
wherein $S^2$ is C$_4$-C$_{24}$alkylene; and
wherein $S^3$ is C$_8$-C$_{24}$alkylene, and
wherein the alkylene is unsubstituted or substituted, straight-chain or branched alkylene, in which one or more —CH$_2$— groups may be replaced by at least one linking group, alicyclic or/and aromatic group,
wherein the at least one linking group is selected from —CO—, —OO—O—, —O—CO—, —NR$^1$—, —NR$^1$—OO—, —CO—NR$^1$—, —NR$^1$—CO—O—, —O—CO—NR$^1$—, —NR$^1$—CO—NR$^1$—, —CH═CH—, —C≡C—, —O—CO—O—, and —Si(CH$_3$)$_2$—O—Si(CH$_3$)$_2$—, wherein R$^1$ represents a hydrogen atom or C$_{1-6}$alkyl, with the proviso that oxygen atoms of linking groups are not directly linked to each other; and
wherein Z is —O—.

4. A composition comprising the photo-orientable material according to claim 1, at least a solvent and at least an additive.

5. The composition according to claim 4 wherein the additive is selected from the group consisting of polymerizable liquid crystal, UV curable compounds, crosslinking agents, silane-containing compounds, photo-active additives, photo-initiators, surfactants, emulsifiers, antioxidant, levelling agent, dyes, epoxy-containing cross-linking agents.

6. A method comprising:
   using the composition according to claim 4 to form an orienting layer for liquid crystals.

7. A method for the preparation of an orientation layer for liquid crystals comprising:
  irradiating the composition according to claim 4 with aligning light.

8. Orientation layers formed from the composition according to claim 4.

9. Optical, electro-optical or nanoelectrical elements comprising orientation layers formed from the composition according to claim 4.

10. A method comprising:
  using the photo-orientable material according to claim 1 to form an orienting layer for liquid crystals.

11. A method for the preparation of an orientation layer for liquid crystals comprising:
  irradiating the photo-orientable material according to claim 1 with aligning light.

12. Orientation layers obtained by the method according to claim 11.

13. Optical, electro-optical or nanoelectrical elements comprising the orientation layers according to claim 12.

14. Orientation layers formed from the photo-orientable material according to claim 1.

15. Optical, electro-optical or nanoelectrical elements comprising orientation layers formed from the photo-orientable material according to claim 1.

* * * * *